US007511270B2

(12) United States Patent
Nakayama et al.

(10) Patent No.: US 7,511,270 B2
(45) Date of Patent: Mar. 31, 2009

(54) NANOTUBE PROBE AND A METHOD FOR MANUFACTURING THE SAME

(75) Inventors: Yoshikazu Nakayama, 9-404, 14-2, Korigaoka 1-chome, Hirakata, Osaka (JP) 573-0084; Takashi Okawa, Osaka (JP); Shigenobu Yamanaka, Osaka (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 455 days.

(21) Appl. No.: 10/570,525

(22) PCT Filed: Sep. 8, 2004

(86) PCT No.: PCT/JP2004/013403
§ 371 (c)(1),
(2), (4) Date: Mar. 3, 2006

(87) PCT Pub. No.: WO2005/024392
PCT Pub. Date: Mar. 17, 2005

(65) Prior Publication Data
US 2007/0018098 A1    Jan. 25, 2007

(30) Foreign Application Priority Data
Sep. 8, 2003    (JP)    ............... 2003-315231

(51) Int. Cl.
*G21K 7/00*    (2006.01)
(52) U.S. Cl. .................. 250/309; 250/306; 250/307
(58) Field of Classification Search .............. 250/309; 73/105
See application file for complete search history.

(56) References Cited

U.S. PATENT DOCUMENTS

| 7,398,678 | B2* | 7/2008 | Nakayama et al. | ............ 73/105 |
| 2006/0150720 | A1* | 7/2006 | Nakayama et al. | ............ 73/105 |
| 2007/0125946 | A1* | 6/2007 | Boye et al. | .................. 250/309 |

FOREIGN PATENT DOCUMENTS

| JP | 2000-227435 | 8/2000 |
| JP | 2002-243616 | 8/2002 |

* cited by examiner

*Primary Examiner*—David A. Vanore
*Assistant Examiner*—Johnnie L Smith, II
(74) *Attorney, Agent, or Firm*—William L. Androlia; H. Henry Koda

(57) ABSTRACT

The present invention realizes a nanotube probe with high durability that can be manufactured in short time with less impurities adhered to the holder sustaining the nanotube. The nanotube probe according to this invention is constructed by fastening a nanotube 8 on the protruded portion 4 of a cantilever by way of at least two partial coating films 12a and 12b. One or more additional partial coating films may be formed in the intermediate area between these two partial coating films. Each partial coating film is formed by irradiating electron beam 10 on the position where the nanotube 8 is in contact with the protruded portion 4 of the cantilever. The partial coating films are separated not to overlap each other. By minimizing the size of partial coating film as well as by narrowing down the beam diameter, coating time may be further shortened. With the beam diameter narrowed down, excessive deposit of impurities can be put under control.

15 Claims, 17 Drawing Sheets

| W/d | 0.1 | 0.3 | 0.4 | 1 | 2 |
|---|---|---|---|---|---|
| Fixing Strength | × | △ | ○ | ◎ | ◎ |

(5 B)

| L/d | 0.3 | 0.5 | 0.8 | 1 | 2 | 3 |
|---|---|---|---|---|---|---|
| Fixing Strength | × | △ | ○ | ◎ | ◎ | ◎ |

(5 C)

| T (nm) | 1 | 2 | 3 | 4 | 7 | 9 |
|---|---|---|---|---|---|---|
| Fixing Strength | × | △ | ○ | ◎ | ◎ | ◎ |

| W／d | 0.1 | 0.3 | 0.5 | 1 | 2 |
|---|---|---|---|---|---|
| Fixing Strength | △ | ○ or △ | ◎ | ◎ | ◎ |

(6 B)

| L／d | 0.3 | 0.5 | 0.8 | 1 | 2 | 3 |
|---|---|---|---|---|---|---|
| Fixing Strength | △ | ○ or △ | ◎ | ◎ | ◎ | ◎ |

(6 C)

| T (nm) | 1 | 2 | 3 | 4 | 7 | 9 |
|---|---|---|---|---|---|---|
| Fixing Strength | △ | ○ or △ | ◎ | ◎ | ◎ | ◎ |

(16A)

(16B)

NANOTUBE PROBE AND A METHOD FOR MANUFACTURING THE SAME

TECHNICAL FIELD

The present invention relates to a nanotube probe utilizing nanotube as a probe needle. More particularly, the present invention relates to a nanotube probe which realizes a concrete method for fastening a nanotube to a holder, and which can be used, for instance, as a probe needle in a scanning probe microscope that picks up images of surface of samples by detecting physical or chemical actions on the sample surfaces, and it further relates to a method of manufacturing such a nanotube probe.

BACKGROUND ART

A scanning probe microscope is a microscope in which a probe needle detects physical or chemical actions from surface atoms of a sample while it is scanned across the surface so that the image of sample surface can be generated from the detected signals. Consequently, the resolving power and measurement accuracy of the scanning probe microscope depend to a large extent on the size and physical properties of the probe needle.

The use of a nanotube, typically a carbon nanotube (CNT), which is sturdy in ultra-minute diameter, for the needle probe of scanning probe microscope has made it possible to realize a high resolution. However, fastening of the nanotube on a holder to retain the needle probe has required very high level of microscopic processing technology.

As far as the nanotube probe and manufacturing method thereof are concerned, the first invention was that of Cobert Daniel Tea, Dye Hongy, et al as disclosed in Patent Publication 2000-516708. Subsequently, in the course of improving said invention, the inventor of the present invention disclosed Patent Publication 2000-227435.

In the patent publication 2000-516708, a nanotube is used as the probe needle for scanning probe microscope, wherein the nanotube is fastened to a protruded portion of a cantilever by means of an adhesive using an optical microscope. However, as the maximum magnification of an optical microscope is limited to 1000 to 2000 times, it was difficult, in principle, to observe directly a nanotube which is as small as 100 nm or less.

Thus, it was difficult even to fix the nanotube to a certain location on the protruded portion of a cantilever, and it was still harder to control the number of fixed nanotubes as well as the orientation thereof. To make the matter worse, it often happened that more than one nanotube were fastened, causing the obtained image to become overlapped or that the angle of the probe needle set with reference to the observed surface deviated far from 90° causing erroneous image to be generated. In other words, the situation was analogous to handling nanotubes in a dark room.

In an attempt to improve such a situation, the patent published 2000-227435 proposed assembly of a nanotube probe in an electron microscope while observing the nanotube directly. To be more specific, it provides a method for manufacturing nanotube probe accurately and simply by fastening the nanotube on the holder surface with coating film generated by irradiation of electron beam.

FIG. 15 shows a schematic diagram of an example of a nanotube probe constructed by the above conventional technology. While being observed directly under an electron microscope, a nanotube cartridge 106 on which nanotubes are adhered and protruded portion 104 of a cantilever are placed facing each other. Subsequently, the both members are caused to approach until the base end portion 108b of the nanotube comes in contact with said protruded portion 104. Here, the nanotube 108 has the tip end portion length A that is sufficient to be used as a probe needle while the based end portion 108b has a base end portion length B.

Next, when an electron beam 110 is irradiated, the impurities floating in the sample chamber of the electron microscope are decomposed, and a coating film 112 is formed with carbon substances, which are generated by re-composition of the decomposed substances. By this coating film 112, the base end portion 108b of the nanotube is fastened to said protruded portion 104 of the cantilever.

As illustrated in FIG. 15, the electron beam 110 has a beam diameter that covers entirely said base end portion 108b of the nanotube. Therefore, impurities 142, 142 existing in the sample chamber are decomposed by the electron beam 110, with the generated carbon substance forming the coating film 112 that covers the base end portion 108b of the nanotube.

However, said carbon substances do not only form the coating film 112, but they also are scattered because they are charged by electrons 140, 140 and repelled by each other. In addition, the debris of the carbon substances are also scattered. Thus, it often happens that impurities 136 stuck to other areas than the coating film 112, and thereby stain the protruded portion of the cantilever. Furthermore, in case that the coating is applied on the entire base end portion 108b of the nanotube, the end face diameter of the electron beam 110 is required to be very large, lowering the energy flow density, which necessitates irradiation of electron beam 110 for very long time.

Furthermore, when the tip end portion length A is established at an appropriate length, the base end portion length B can sometimes be considerably long as shown in (15B). If the base portion length B is larger than the beam diameter, in order to provide full coating of the base end portion 108b, it is necessary to use a multi-step formation of the coating film 112 by moving the electron beam 110 in the direction of the arrow m. However, the larger is the covering area of the coating film, the longer would be the time for fastening operation with according increase of impurity 136 that adheres to the protruded portion of the cantilever. As the result, some of said nanotube probes were too much stained with the impurities to be offered as a commodity.

FIG. 16 shows a schematic diagram of another defective nanotube probe as well as an illustration thereof in measuring operation. Once the nanotube 108 has been fastened to the protruded portion of the cantilever 104 in a state wherein the nanotube does not pass the sharp end of the protruded portion by way of one-shot coating over full length of the base end portion of the nanotube, it is impossible to correct such displacement of nanotube. Such displacement is liable to happen when the nanotubes have been arranged obliquely on the nanotube cartridge 106.

Such displaced fastening of nanotube can lead to a problem that the sharp end of the protruded portion 107 may function as a probe needle as well as the end of the nanotube 108C in an AFM measurement. If the nanotube 108 is displaced from the sharp end scanning point 150 and the nanotube scanning point 152 may pick up dual image, resulting in erroneous information of sample surface 148.

FIG. 17 shows a schematic diagram of a conventional cantilever having protruded portion 104 with curved side face as well as a nanotube 108. In case the side face 122 of the protruded part of the cantilever 104 is curved concavedly, it is required to fasten the nanotube 108 on the curved side face 122. With clearance between the protruded portion 104 and the nanotube 108, the overall coating film 122 can provide effective fastening only at the vicinity of the sharp tip end and the bottom of the protruded portion, leaving all other areas of coating film not contributing to fastening. As described above, there are many areas that need to be improved in the conventional overall coating method.

Accordingly, the object of the present invention is to provide a nanotube probe that is fastened to a holder with strength equal to or greater than a prescribed level and that allows fastening time to be shorter, and further to provide method for manufacturing thereof. Furthermore, another object of the present invention is to provide a nanotube probe that suffers minimum adherence of impurities in fastening process, and that can be fastened with increased strength, and further provide method for manufacturing thereof.

DISCLOSURE OF INVENTION

The present invention is to accomplish the above-described object. The first embodiment of the present invention is a nanotube probe comprising a holder and a nanotube fastened thereon by a coating film on a base end portion of said nanotube in such fashion that a tip end portion of said nanotube is protruded, characterized in that said coating film comprises a plurality of partial coating films fastening, respectively, a plurality of positions of said base end portion of said nanotube on a surface of said holder, and said partial coating films are separated without overlapping each other.

The second embodiment of the present invention is a nanotube probe wherein each of said partial coating film is designed to satisfy a relationship of $W/d \geqq 0.1$, where W represents the maximum width of a skirt of said coating film in contact with said holder in a direction perpendicular to an axis of said nanotube, and d represents a diameter of said nanotube The third embodiment of the present invention is a nanotube probe wherein each of said partial coating film is designed to satisfy a relationship of $L/d \geqq 0.3$, where L represents an axial length of said partial coating film directly holding said nanotube and d represents a diameter of said nanotube.

The fourth embodiment of the present invention is a nanotube probe wherein an average thickness T of said partial coating film is 1 nm or more.

The fifth embodiment of the present invention is a nanotube probe wherein a protruded portion of a cantilever is used as said holder, said base end portion of said nanotube is arranged so as to contact with said protruded portion, and said partial coating film is formed on each of two or more contact areas.

The sixth embodiment of the present invention is a nanotube probe wherein a side face of said protruded portion is curved up to a tip end of said protruded portion, and said partial coating films are formed at positions where said base end portion of said nanotube is in contact with said curved surface.

The seventh embodiment of the present invention is a nanotube probe wherein said nanotube is arranged so as to pass through a vicinity of said sharp tip end of said protruded portion.

The eighth embodiment of the present invention is a method for manufacturing a nanotube probe comprising a holder and a nanotube fastened thereon by way of a coating film on a base end portion of said nanotube in such fashion that a tip end portion is protruded, said method for manufacturing a nanotube probe characterized in that said coating film comprises at least two partial coating films, a first coating film is formed by coating partially a first fastening position of said base end portion of said nanotube while keeping said first fastening position in contact with said surface of said holder, a second partial coating film is formed by coating partially a second fastening position of said base end portion of said nanotube while keeping said second fastening position in contact with said surface of said holder, and said first and second partial coating films are separated without overlapping each other.

The ninth embodiment of the present invention is the method for manufacturing said nanotube probe, wherein a protruded portion of a cantilever is used as said holder, said first partial coating film is formed at a lower position of said base end portion of said nanotube, and said second partial coating film is formed at an upper position of said base end portion of said nanotube while keeping said nanotube in such fashion that said nanotube passes through a vicinity of a sharp tip end of said protruded portion.

The tenth embodiment of the present invention is the method for manufacturing said nanotube probe, wherein, in a case that a side face of said protruded portion of said cantilever is curved up to its sharp tip end, said first partial coating film is formed at said lower position of said base end portion of said nanotube, an intermediate area of said nanotube is kept in non-contact with said protruded portion, and second partial coating film is formed at a contact area where said upper position of said base end portion of said nanotube is in contact with said vicinity of said sharp tip end of said protruded portion.

The eleventh embodiment of the present invention is the method for manufacturing said nanotube probe, wherein, in a case that a side face of said protruded portion of said cantilever is curved up to its sharp tip end, said first partial coating film is formed at said lower position of said base end portion of said nanotube, an intermediate area of said nanotube is forcibly bent along said curved surface, said nanotube is adjusted around said first partial coating film as a fulcrum so as to cause said nanotube to pass through said sharp tip end of said protruded portion, no matter which of said forcible bending or said passing adjustment is performed first, and said second partial coating film is formed at a contact area where said upper position of said base end portion of said nanotube is in contact with a vicinity of said sharp tip end of said protruded portion.

The twelfth embodiment of the present invention is the method for manufacturing said nanotube probe, wherein said intermediate area is fastened by a third partial coating film after forming said second partial coating film.

The thirteenth embodiment of the present invention is the method for manufacturing said nanotube probe according to the eighth through the twelfth embodiments, wherein each of said partial coating film is formed in an electron microscope or a focusing ion beam apparatus while observing the work directly.

The fourteenth embodiment of the present invention is the method for manufacturing said nanotube probe according to the thirteenth embodiment, wherein each of said partial coating films is formed by deposit of decomposed components generated by means of an electron beam or an ion beam.

The fifteenth embodiment of the present invention is the method for manufacturing said nanotube probe, wherein a size of said partial coating film is controlled by way of restricting a scanning range of said electron beam or said ion beam.

According to the first embodiment of the present invention, as the nanotube is fastened to the holder by means of partial coating films, drastic reduction of time required for forming the coating film, compared to the conventional overall coating film, is made possible by making the size of the partial coating film as small as possible. A nanotube is generally hard to be visualized in entirety even under such a magnifying device as electron microscope. In particular, it is difficult even for a skilled observer to identify the end of a nanotube. Since the overall coating method requires that the furthest back end of the nanotube is visually identified in the process of coating, it involves enormous length of time for coating. On the other hand, in the case of partial coating film method, this requirement for identifying the back end of the nanotube is completely eliminated, whereby such advantages as shortened time of coating film formation and extremely simplified coating operation can be accomplished. In other words, because the operation is nothing more than applying partial coating at two positions, at the least, identified under microscope, practicability of the manufacturing operation can be improved drastically. Furthermore, although fastening the nanotube at minimum two positions on the base end portion of the nanotube is sufficient to keep the nanotube fixed, it is possible to increase the fastening points to three or four points.

According to the second embodiment of the present invention, the partial coating film can have sufficient fastening strength to fix the nanotube on the holder by forming the film in such fashion that satisfies a relationship of $W/d \geqq 0.1$, where W represents the maximum width of the skirt of the coating film, and d represents the diameter of the nanotube. The partial coating film is formed in rectangular, round or other arbitrary shape, and it is analogous to fixing a nanotube with a piece of band-aid, wherein the fixing strength depends on the length of the end of said band-aid adhered to the holder surface. This length of adhesion is referred to as the maximum coating film skirt width W that the inventor has first discovered to provide for the initial fastening strength as long as the width is greater than 0.1 times the nanotube diameter d. As the coating film is formed in various configuration, such as rectangular, round, oval or curved shape, the film skirt length varies depending on longitudinal positions thereon. In the present invention, we focused on the maximum skirt width of the coating film to discover the said parameter. As this discovery had defined the lower limit for the maximum coating film width, it has eliminated the necessity for excessive fastening strength experienced in the conventional coating practice. Consequently, a substantial reduction of coating time can be realized by the present invention. Although there is no upper limit for the maximum coating film skirt width, it may be set forth in consideration of the coating time.

According to the third embodiment of the present invention, the partial coating film can have sufficient fastening strength to fix the nanotube on the holder surface by forming the film in such fashion that satisfies a relationship of $L/d \geqq 0.3$, where L represents the coating length, and d represents the diameter of the nanotube. As mentioned earlier, the partial coating film is analogous to a piece of band-aid for fastening the nanotube on the holder. The length of the band-aid in the axial direction holding the nanotube is referred to as the coating length, which is one of the factors determining said fastening strength. Although the coating film can be formed in a variety of configurations, this coating length is simply determined. The inventor, et al has clarified that, if the coating length is 0.3 times the diameter of the nanotube, the obtained initial fastening strength would be sufficient. As this discovery has defined the lower limit for the partial coating length L, it has eliminated the necessity for excessive fastening strength experienced in the conventional coating practice. Consequently, substantial reduction of coating time can be achieved by the present invention. Although there is no upper limit for the coating length L, it may be set forth in consideration of the coating time.

According to the fourth embodiment of the present invention, it is possible to provide a nanotube probe with sufficient fastening strength to endure practical use, by forming a partial coating film with the average film thickness greater than 1 nm. Although it is desirable that the partial coating film has uniform thickness, it cannot practically be completely uniform. If the film thickness were uniform, the average thickness would be equal to the measured thickness. In case that the film thickness is not uniform, the average film thickness is available for judgment. As a matter of course, the greater is the average film thickness, the stronger is the coating. However, an increase of the average coating film thickness can result in unnecessarily extended coating time. The inventor, et al have experimentally established that if the average coating film is 1 nm or more ($T \geqq 1$ nm), fastening of nanotube can be secured. In the conventional overall coating film method, an unnecessarily thick film thickness has contributed to the tremendous coating time. Since the present invention allows the average film thickness to be controlled for a minimum value of 1 nm, drastic reduction of coating time as well as simplification of the film coating operation can be achieved.

According to the fifth embodiment of the present invention, because a cantilever used in the atomic force microscope (called "AFM") can be utilized as a holder, a nanotube probe can be manufactured relatively simply by fastening a nanotube on this cantilever by means of two or more partial coating films. Furthermore, as a microscopic cantilever driving apparatus incorporated in the AFM can be utilized as it is, the nanotube probe can be easily driven under control in the coating operation. In the present invention, the configuration of the protruded portion is optional so that any of pyramids or cones can be utilized. It is merely required to form partial coating films at positions where the surface of the protruded portion and the base end portion of the nanotube contact.

According to the sixth embodiment of the present invention, a protruded portion of a cantilever formed curvedly can be used as a holder. In the conventional semi-conductor, since the protruded portion is designed to be used as a probe needle, the protruded portion is sometimes formed to have curved, either concaved or convexed, side face in order to make its end sharper. In this invention, it is noted that when a bar shaped nanotube is placed in contact with said curved surface, there exists at least two points in the upper and lower positions, where partial coating film can be formed to fasten the nanotube. Thus, in case there is more than one contact points, the present invention can be effectively utilized to achieve approximately the same fastening strength as in the case of overall coating.

According to the seventh embodiment of the present invention, the nanotube is fastened to the protruded portion of the cantilever in such fashion that it passes through the vicinity of the sharp tip end of the protruded portion, so that highly accurate image of sample surface can be obtained through the surface signals from the nanotube probe needle scanned over the sample surface. With the sharp tip end of the protruded portion being prevented from functioning as a probe needle, the problem of dual exposure can be eliminated.

The eighth embodiment of the present invention provides a method of manufacturing to realize said first embodiment. This method comprises first selecting at least two points on the base end portion of a nanotube that are in contact with a holder and fastening these parts by forming partial coating films at these positions referred to as the first fastening position and the second fastening position, no matter whichever position is fastened first. As the partial coating films occupies by far smaller coating area than the overall coating method, the present invention provides a benefit of dramatic reduction of coating time. Generally, the fastening strength of a nanotube is dependent upon the area of coating film. However, if said relationship of W/d≧0.1, L/d≧0.3 and/or T≧1 (nm) is taken into consideration, it is possible to design the fastening strength to have a prescribed value or more by establishing a minimum area of the partial coating films.

According to the ninth embodiment of the present invention, after the first partial coating film is formed on the lower position, the nanotube is tilted clockwise or counterclockwise around the first partial coating film as the fulcrum so that the nanotube passes through the sharp tip end of the protruded portion of the cantilever, thereafter the second partial coating film is formed. Such a two-stepped fastening method allows the nanotube to be placed properly so that the defect ratio of the nanotube probe can be reduced substantially. Furthermore, since a nanotube probe thus made permits only the nanotube probe needle to scan the sample surface to pick up surface signals for forming surface images, it is made possible to manufacture such nanotube probe that would not cause double exposure by the sharp tip end of the protruded portion of the cantilever.

According to the tenth embodiment of the present invention, a nanotube probe can be manufactured by the use of a cantilever with a protruded portion curved for increased sharpness of its tip end. In the case that a straight nanotube bar is fit on a concavedly curved surface, the nanotube contacts the curved surface at two, lower and upper, points, leaving the intermediate area non-contact. With the nanotube placed as such, first a partial coating film is applied on the lower contact point. Then the nanotube is tilted clockwise or counterclockwise around the first partial coating film as the fulcrum so that the nanotube passes through said sharp tip end, and subsequently another partial coating film is applied on the upper contact point. Thus, these two partial coating films can fasten the nanotube firmly, even though the intermediate area is left free of contact. Furthermore, in case of convexedly curved surface, while the intermediate area of the nanotube is in contact with the surface, two partial coating films on the lower and the upper positions can fasten the nanotube firmly. At the same time, because the attitude of the nanotube is corrected certainly, defect ratio of the nanotube probes can be reduced drastically. As the sharp tip end of the protruded portion is prevented from functioning as a probe needle, double exposure is precluded.

According to the eleventh embodiment of the present invention, because the nanotube is fastened to the curved surface of the protruded portion of the cantilever while the former is forcibly bent along, and attach to, the latter, the fastening strength is reinforced by the Van der Waals force acting between the nanotube and the protruded portion of the cantilever. The curved surface of the protruded portion is either concaved or convexed. In either case, when the base end portion of the nanotube is forcibly bent along the curved surface, the tip end portion of the nanotube is oriented toward the direction of protrusion of the protruded portion, whereby the nanotube probe needle tends to be placed perpendicular to the sample surface. Thus, in scanning the sample surface, the nanotube probe can follow steep indentations and protrusions on the sample surface, allowing the image of sample surface to be picked up more accurately. Furthermore, as the attitude of the nanotube is forcibly corrected, defect ratio of the nanotube probes can be reduced drastically.

According to the twelfth embodiment of the present invention, as a partial coating film, or films, is provided on the intermediate area in said eleventh embodiment, the nanotube is fastened at three positions or more, which enable to realize stronger fastening.

According to the thirteenth embodiment of the present invention, as an electron microscope and focusing ion beam apparatus are employed to make it possible to work on the cantilever and nanotube while directly observing them under magnification, highly accurate assembly is made available.

According to the fourteenth embodiment of the present invention, the use of electron beam or ion beam to decompose the impurities in the equipment, letting decomposed substances deposit is beneficial in that a partial coating film can be formed easily in short time. Another benefit is that for said electron beam and ion beam, a ready made electron microscope and focusing ion beam apparatus (FIB apparatus) can be used without requiring any new charged beam generator.

According to the fifteenth embodiment of the present invention, the size of the coating, i.e. the coating length L, the maximum coating skirt width W can be freely changed by regulating the scanning range (beam oscillation width) of the electron beam or ion beam. Thus, said conditions, W/d≧0.1 and L/d≧0.3, can be easily satisfied. Furthermore, as it is possible to minimize the beam diameter of the electron beam or the ion beam, it can effectively minimize deposition of decomposed substances on other area than the coating area. In addition, since the average coating film thickness can be controlled by regulating the beam irradiation time, said condition of film thickness, i.e. T≧1 (nm) can be easily achieved.

BRIEF DESCRIPTION OF DRAWINGS

FIG. 5 show relationship between the nanotube diameter d, the size of partial coating film and the fixing strength.

FIG. 6 shows similar relationship in the case of etching treatment given on the surface on which nanotube 8 is fastened.

BEST MODE OF CARRYING OUT THE INVENTION

The inventor of the present invention and his team have made strenuous development efforts to improve the nanotube probe constructed by the overall coating method, with a result that a nanotube probe by way of partial coating films have been completed. Following are more detailed description of the present invention related to nanotube probes and manufacturing method thereof with reference to the accompanying drawings.

This partial coating method provides for a nanotube probe and manufacturing method thereof, wherein a nanotube can be fastened to a surface of a holder in short time, the amount of impurities adhering to the holder surface can be reduced to a bare minimum, and an arbitrary shape of holder can be used.

In the following description of embodiments, a protruded portion of a cantilever used for AFM is used as a holder on which a nanotube is fastened. However, the holder is not limited to cantilevers, but any other component on which a nanotube can be fastened and which allows the nanotube to be controlled minutely may, of course, be used.

Figure 1:
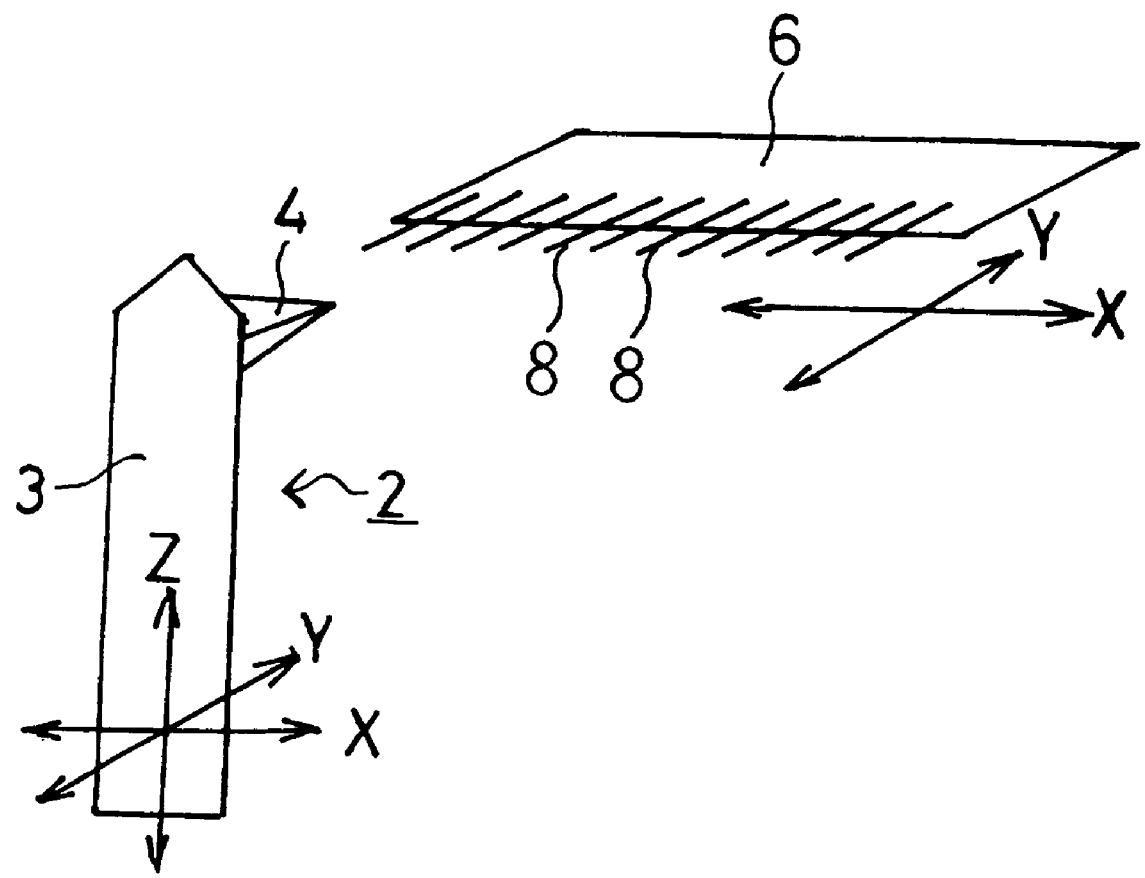
FIG. 1 is an outlined structural diagram of a device used to fasten a nanotube 8 to a cantilever 2.

FIG. 1 is an outlined structural diagram of a device used to fasten the nanotube 8 on the cantilever 2. The cantilever 2 used for AFM is composed of a cantilever portion 3 and protruded portion 4 that is used as a holder for fastening a nanotube. A plurality of nanotubes 8 are adhered to a nanotube cartridge 6, which is a source of supply of nanotubes. In order to assemble a nanotube probe, one of the nanotubes 8 on the nanotube cartridge 6 is fastened to said protruded portion 4, and subsequently the nanotube 8 is pulled away from the nanotube cartridge 6.

As a matter of course, the nanotubes 8,8 are not fixed on the nanotube cartridge 6, but merely adhered thereto. The cantilever 2 can be driven in three directions, XYZ, while the nanotube cartridge 6 can be moved in two directions, XY. Since the operation is conducted in a real time observation under a scanning electron microscope, it has been made possible to ensure extremely minute control of driving.

Figure 2:
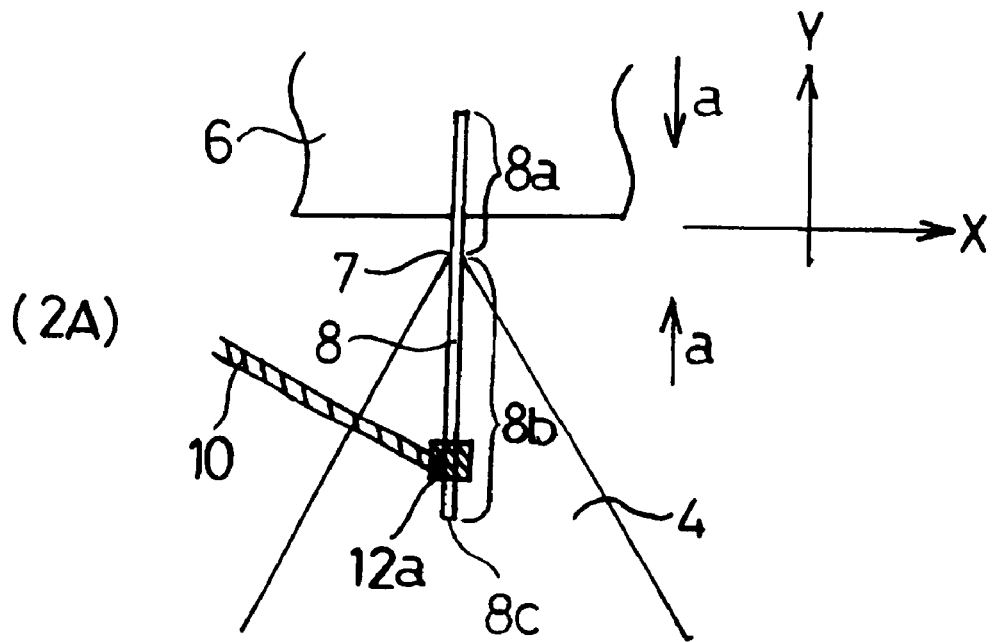
FIG. 2 is an explanatory diagram illustrating the method of fastening a nanotube.
Figure 2:
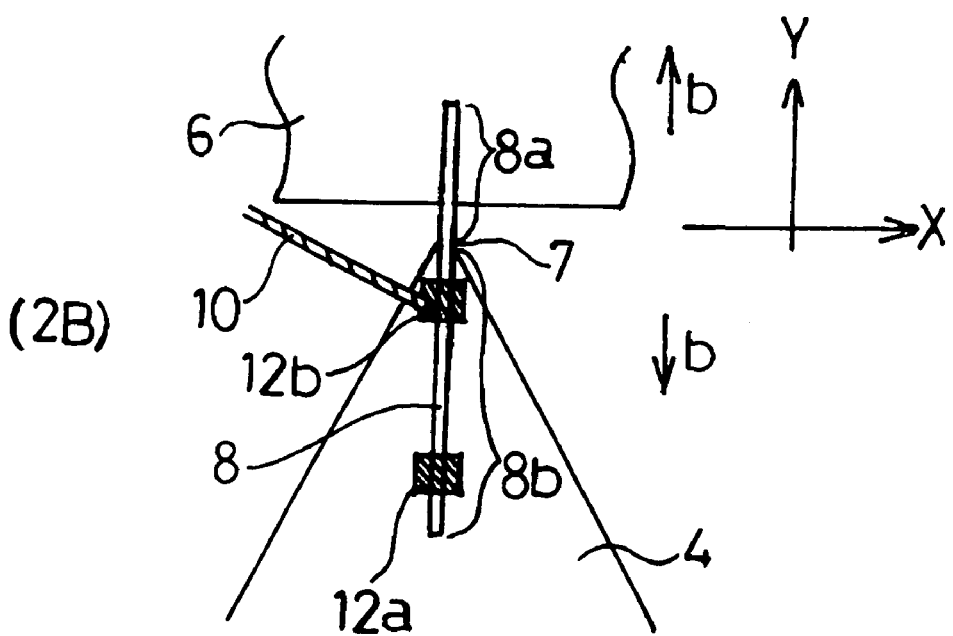

FIG. 2 is an explanatory diagram showing the procedure for fastening the nanotube 8. As illustrated in (2A), the cantilever is first driven in the direction of the arrow a while observing directly under an electron microscope, so as to have the sharp tip end 7 of the protruded portion 4 of the cantilever approach said nanotube 8 until they are minutely close to each other. In so doing, said nanotube 8 is divided by the protruded portion 4 of the cantilever into a tip end portion 8a and a base end portion 8b. Once said base end portion of the nanotube 8b has come in contact with said protruded portion 4 of the cantilever, an electron beam 10 is irradiated on a first fastening position selected arbitrarily to form a first partial coating film 12a. In the case of observation under an electron microscope, a high degree of skill is required to identify the end of the nanotube 8c. That is the reason why said first coating film 12a is formed at a position a certain distance away from the end of the nanotube 8c.

In the next process shown in (2B), a second partial coating film is formed by applying irradiation of an electron beam on a second fastening position 12b which is located on the upper area of the base end portion 8b. Thus, the base end portion of the nanotube 8b is fastened to the protruded portion 4 of the cantilever. The first and second partial coating films are formed by deposit of decomposed components generated through irradiation of an electron beam on the impurities in the electron microscope. In case said impurity gas is an organic gas, the deposit of decomposed components is often constituted by carbon substances. On the other hand, in case a metallic organic gas is employed, the deposit of decomposed component is constituted by a metallic substance. Thus, the material that constitutes the coating film can be selected arbitrarily.

After both the first partial coating film 12a and the second partial coating film 12b have been formed, said protruded portion 4 of the cantilever and the nanotube cartridge 6 are separated from each other in the direction of the arrow b. Here, as a matter of course, the adhesive strength between the nanotube 8 and the nanotube cartridge 6 is weaker than the fastening strength of the first partial coating film 12a and the second partial coating film 12b. Consequently, in said separating process, the nanotube 8 as integrated with the protruded portion 4 of the cantilever, is separated from the nanotube cartridge 6.

Figure 3:
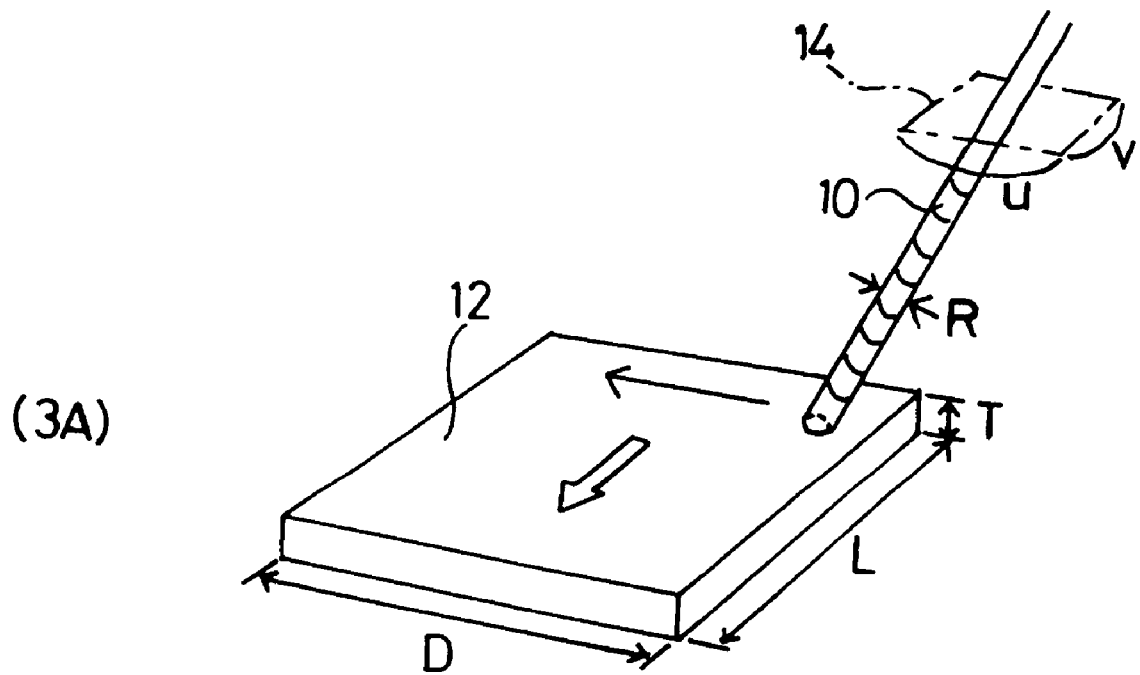
FIG. 3 is an explanatory diagram illustrating a partial coating film 12 formed by an electron beam 10.
Figure 3:
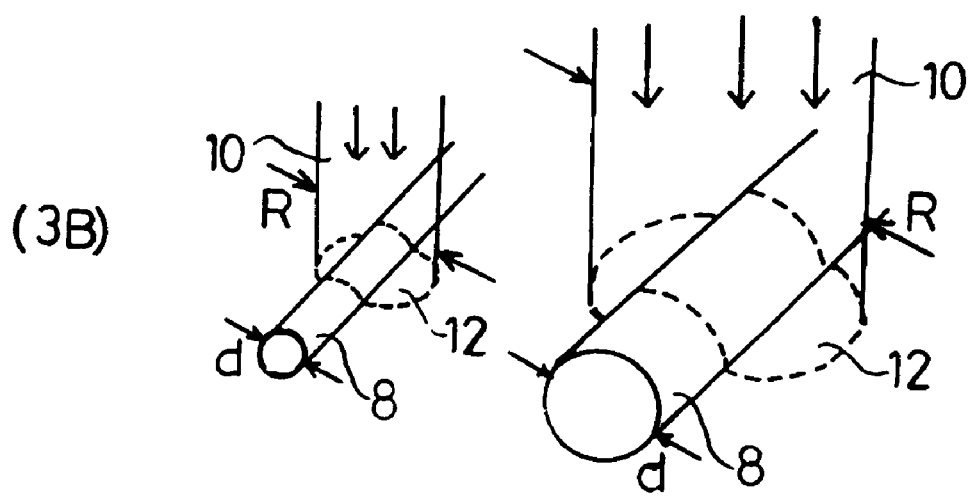

FIG. 3 is an explanatory diagram illustrating a method for forming a coating film 12 by way of the electron beam 10. There are two methods for forming a coating film. The first method uses an extremely thin electron beam scanned over a prescribed scanning range which is variable for adjusting the size of the coating film. The second method uses a much larger electron beam of which diameter is variable for adjusting the size of the coating film.

Said first method, as shown in (3A), employs an electron beam 10 of which diameter is narrowed down to the extreme (e.g. several nm to 10 nm). By oscillating this electron beam 10 within a prescribed scanning range, the coating film 12 is formed. For example, if the beam diameter R is 4 nm and the scanning range is preset as a square of 20 nm across, the size of the coating film 12 obtained is approximately 30 nm across. The size of the coating film 12 is in the same order as the size of the scanning range 14, but not necessarily identical. Nevertheless, there exists a certain dependence relationship between the size of scanning range 14 and the size of the coating film 12.

Said scanning range 14 is an area defined by side width u and longitudinal width v realized by a deflecting coil. The coating film 12 is formed by oscillating the irradiation of the electron beam 10 within the scanning range 14. Furthermore, by changing the scanning range size, the size of the coating film can be controlled. Depending on the diameter of the nanotube to be fastened, the scanning range may be enlarged or narrowed down. Since the width D, the length L and the average thickness T of the coating film 12 are respectively subject to certain relationship with the nanotube diameter d, as discussed later, it is possible to ensure desired strength of fastening by forming a coating film in such manner that would satisfy these relationships.

In (3B), the second method is utilized, wherein the diameter R of the electron beam 10 is adjusted from a small to a larger diameter with the change of aperture in accordance with the change of the nanotube diameter d from small to larger. Here, the electron beam 10 is in a state of direct irradiation without scanning. In other words, in response to change of the nanotube diameter 8 from thin (left) to thick (right), the beam diameter R of the electron beam 10 can be adjusted, so that a partial coating film 12, 12 with desired fastening strength may be obtained through irradiation thereof. As the result, the average thickness T, the coating length L and the maximum skirt width W of the partial coating film 12, as discussed in more details later, can be freely changed in accordance with the nanotube diameter d as well as the configuration of the holder surface.

As a third method, it is also possible to combine adjustable beam scanning range and adjustable beam diameter R by variable aperture. For instance, in order to form a square coating film of 100 nm across, it is considered appropriate to use an electron beam diameter R of 30 nm together with a beam scanning range of 80 nm across. It goes without saying that such two-stepped adjustment can be changed freely in accordance with particular purposes.

As far as the material of the partial coating film is concerned, it is possible to select such a material that would provide required properties such as fastening strength, conductivity, insulating performance, magnetic characteristics, etc. In case an organic gas is used as the impurity gas in the electron microscope chamber, said partial coating film is made of carbon substances generated by decomposition due to electron beam. In case a metallic organic gas is used as the impurity gas, said partial coating film 12 is composed of a metallic substance decomposed. It is possible to adjust said properties of the coating film by selecting the metallic elements.

Figure 4:
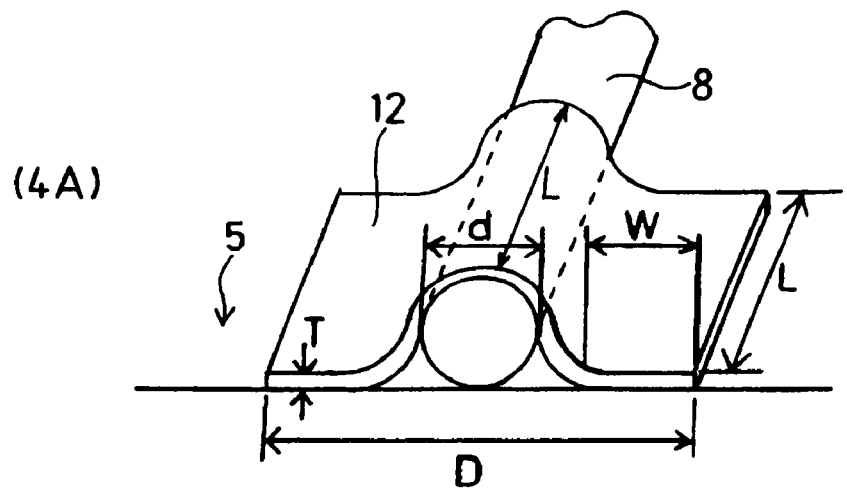
FIG. 4 is an explanatory diagram showing the relationship between the size of a partial coating film 12 and the nanotube diameter d.
Figure 4:
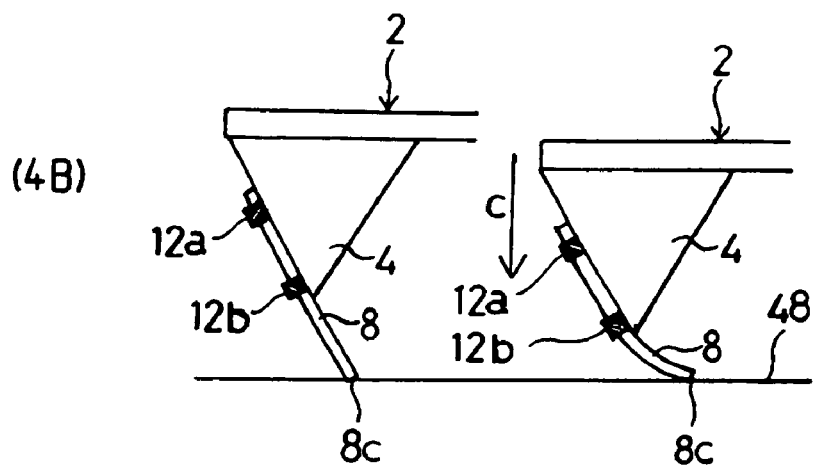
Figure 4:
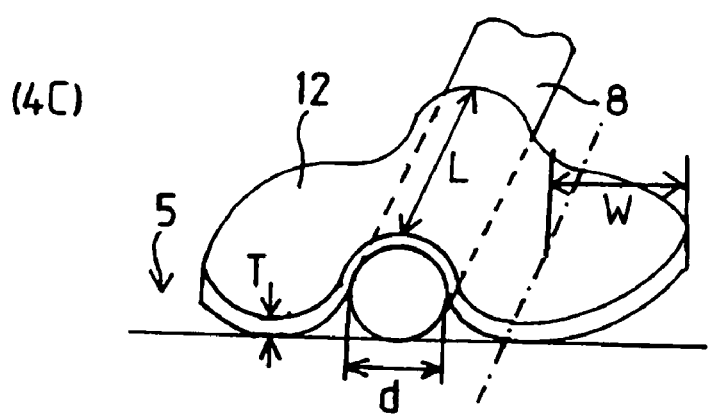

FIG. 4 is an explanatory diagram showing relationship between the size of the partial coating film 12 and the nanotube diameter d. As shown in (4A), the partial coating film 12 is dimensionally defined as follows. The length in the direction perpendicular to the nanotube of the area wherein the coating film is in contact with the protruded portion 4 of the cantilever is referred to as the "coating skirt width". As the partial coating film 12 here is rectangular, the coating skirt width is constant, hence the maximum coating skirt width is equal to the coating skirt width. Therefore, this diameter may be called either the coating skirt width of the maximum coating skirt width. The length of the coating film in the axial direction is referred to as the coating length L. In this case, since the coating film is rectangular in shape, the width of the partial coating film 12 is same as said coating length L. The nanotube diameter is expressed as d, and the average film thickness T.

In an effort to investigate into the relationship between the size of the partial coating film 12 and the fastening strength with reference to the nanotube diameter d, a series of durability test was conducted as shown in (4B). In this durability test, a nanotube 8 fastened to a protruded portion 4 of a cantilever 2 by a first partial coating film 12a and a second partial coating film 12b was used. The cantilever was first placed in such position that the tip end 8c of the nanotube 8 came in contact with a sample surface 48, then the cantilever was further approached in the direction of arrow C perpendicular to the sample surface so as to bend the nanotube 8. Subsequently, while keeping such bent state, the nanotube 8 was moved over the sample surface 48. After completion of 100 cycles of such movement, the fastening strength of the partial coating film 12 was measured. The test results are as summarized in FIG. 5.

Although the dimensions of a rectangular partial coating film are defined in (4A), the shape of the partial coating film is not limited to rectangular or square. Instead, it is possible to form the partial coating film in various shapes in accordance with the configuration of the protruded portion of cantilever, by changing the shape of the beam section of the electron beam and/or the shape of the scanning range. As an example, an oval shaped coating film 12 is shown in (4C). Here, in the contact area between the partial coating film 12 and the surface 5 of the protruded portion, the largest length in the direction perpendicular to the nanotube from the nanotube to the end of the coating film is defined as the maximum coating skirt width. Furthermore, the axial length of the coating portion directly holding the nanotube 8 is referred to as the coating length L.

The shape of the partial coating film on the nanotube probe specimen used in the durability test shown in (4B) was not limited to rectangular, but inclusive of oval shape, etc. However, a test has demonstrated that the relationship between the ratio of the maximum coating skirt width W and the coating length L to the nanotube diameter d and the nanotube fastening strength was virtually consistent at least among the rectangular and oval shapes of the coating films. From this, it can be concluded that the relationship between the respective dimensions and the nanotube diameter as shown in FIG. 5 generally hold true unless the coating film shape is excessively different.

FIG. 5 shows the resultant relationship between respective dimensions of the partial coating films, as related to the nanotube diameter d, and the fastening strength. The fastening strength was graded into four levels; excellent (◎), good (○), acceptable (Δ), and unacceptable (X). The former three levels, excellent, good and acceptable levels are judged to be satisfactory, whereas the unacceptable level is rejected. In order to make the above judgment, the tested nanotube probes were subjected to an AFM image photography test for evaluation of visibility by skilled personnel. In the case of unacceptable level, various causes such as early dislodging of nanotube and wear on the tip end of nanotube are conceivable.

In (5A), various ratio of the maximum coating skirt width W to the nanotube diameter d were evaluated. In the case of $W/d=0.1$, the nanotube probe was found unacceptable, while $W/d=0.3$ or more was found to be acceptable. In other words, in order that said partial coating film provides minimum required fastening strength for a probe needle, $W/d \geqq 0.3$ must be satisfied. Furthermore, $W/d \geqq 0.5$ produced a desirable fastening strength, and $W/d \geqq 1$ would be still more desirable.

In (5B), various ratios of coating length L to the nanotube diameter d were evaluated. In the case of $L/d=0.3$, the nanotube probe was found unacceptable, while $W/d=0.5$ and 0.8 respectively produced ○ and ◎ ratings, revealing that $L/d=0.5$ or more was found to be acceptable. In other words, in order that said partial coating film provides minimum required fastening strength for a probe needle, $L/d \geqq 0.5$ must be satisfied. Furthermore, $L/d \geqq 0.8$ produces a desirable fastening strength, and $L/d \geqq 1$ would be still more desirable.

In (5C), various average thickness of coating film was evaluated. In the case of $T=1$ nm, the nanotube probe was found unacceptable, while $T=2$ nm, 3 nm and 4 nm respectively produced Δ, ○ and ◎ ratings. In other words, in order that said partial fastening strength for a probe needle, said average coating film thickness T must be 2 nm or more. Furthermore, $T \geqq 3$ nm would produce a desirable fastening strength, and $T \geqq 4$ nm would be still more desirable.

FIG. 6 shows similar ratings of fastening strength of the nanotubes 8 on the etched cantilever. It is expected that an etching treatment on the protruded portion of the cantilever would improve the firmness of fastening, due to reformation of the surface of the protruded portion. Here, there are many types of etching treatment, including chemical etching using hydrofluoric acid or phosphoric acid, electrolytic etching, plasma etching and laser beam etching. Out of these, a proper etching method can be selected in accordance with the purposes. Like in FIG. 5, ratings of fastening strength with etching are summarized on the basis of W/d, L/d and T.

As shown in (6A), even with W/d value of 0.1, the minimum required fastening strength was obtained for actual service. W/d≧0.3 produced more desirable rating, and W/d≧0.5 showed excellent rating. As shown in (6B) the minimum required strength was obtained with L/d≧0.3, while L/d≧0.5 and L/d≧0.8 produced, respectively, more desirable and excellent ratings. As shown in (6C) as far as the average coating thickness T is concerned, T≧1 nm was found to be the minimum required coating thickness, while T≧2 and T≧3 generated desirable and excellent ratings.

Thus it has been verified that the fastening strength can be improved by etching to an extent corresponding to one level in said rating. Such improvement is considered to be attributable to reformation of the surface of the protruded portion of the cantilever that allows increased strength of binding with the nanotube. Taking account of etching treatment, necessary fastening strength has been found available, if W/d≧0.1, L/d≧0.3 and T≧1 nm are satisfied. Without etching, W/d≧0.3, L/d≧0.5 and T≧2 nm would be required to obtain necessary fastening strength.

Figure 7:
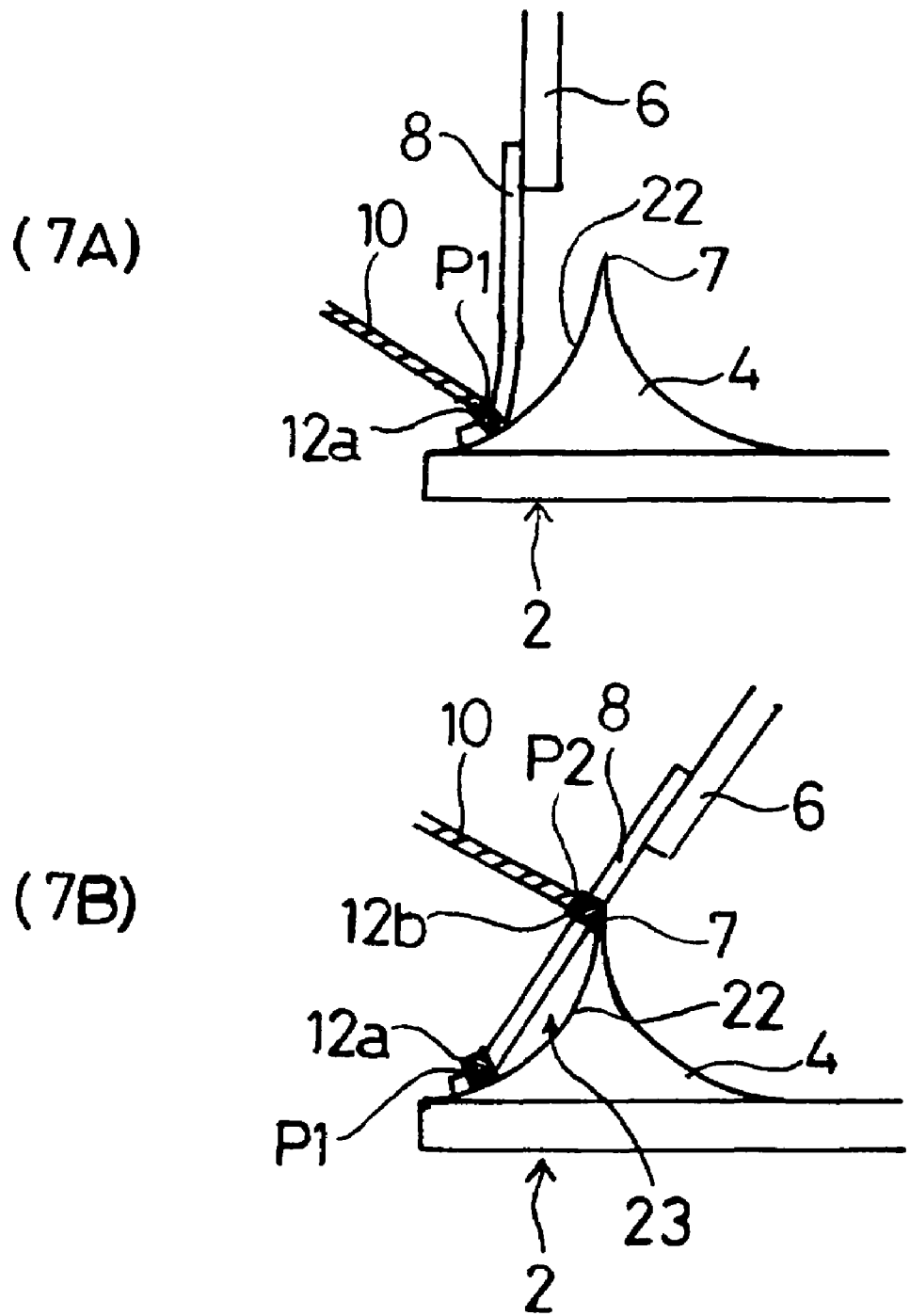
FIG. 7 is a process diagram showing a method of fastening a nanotube 8 on a curved protruded portion 4 of a cantilever.

FIG. 7 is a process diagram showing a method for fixing a nanotube 8 on a protruded portion 4 of cantilever formed with curve. First a nanotube adhered on the nanotube cartridge 6 is located close to the curvedly formed surface 22 of the protruded portion 4. the first partial coating film 12a is then formed by irradiating an electron beam 10 at the first fastening position P1 where said nanotube 8 comes in contact with said curved surface 22 of protruded portion. Then, the nanotube 8 is tilted so as to have it contact the curved surface at the second fastening position P2 in the vicinity of the tip end 7 of the protruded portion. By irradiation of the electron beam 10 at said position P2, the second partial coating film 12b is formed. As the result, the nanotube 8 is fastened to said curved surface 22 at least two positions in contact, and while so doing, the prescribed fastening strength is maintained by satisfying said coating conditions. In the meantime, furthermore, as the clearance 23 existing between the nanotube 8 and the curved surface 22 is left uncoated, the overall coating time is reduced and efficient coating operation is made available.

Figure 8:
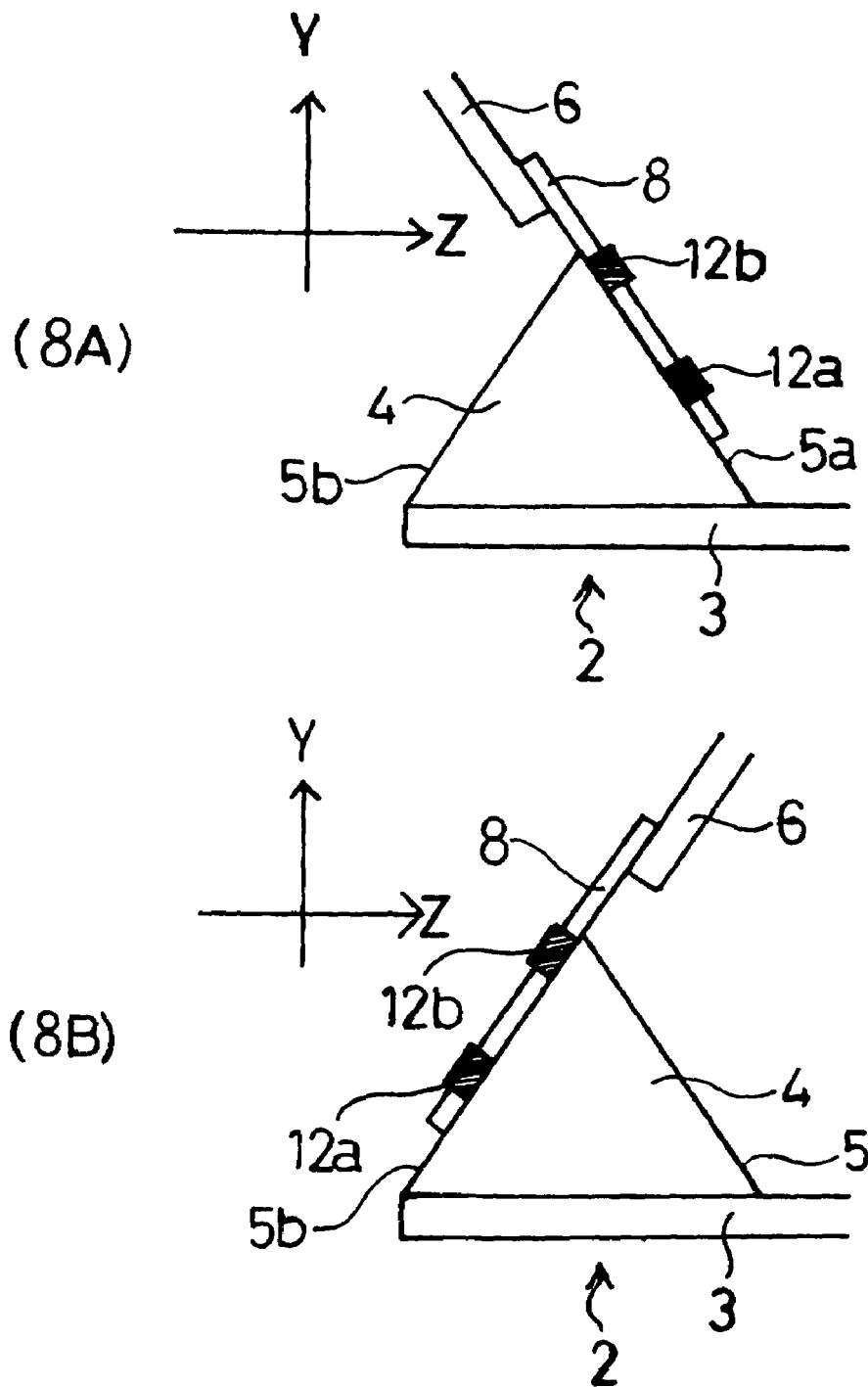
FIG. 8 is a process diagram showing a method of fastening a nanotube 8 on a straight protruded portion 4 of a cantilever.

FIG. 8 is an explanatory diagram of a method for fastening a nanotube 8 on a non-curved protruded portion 4. The protruded portion 4 of the cantilever is formed to have a straight, instead of curved, surfaces 5a and 5b. The first coating film 12a and the second coating film 12b are formed on either 5a or 5b of the surface to fasten the nanotube 8. In (8A), the cantilever portion 3 is oriented in Z-axis with its protruded portion oriented in Y-axis while the nanotube 8 is fastened on the surface 5a. In (8B), the nanotube 8 is fastened on the surface 5b of the protruded portion 4 of the cantilever. Thus, the nanotube 8 can be fastened to either the surface 5a or the surface 5b of the protruded portion 4 of the cantilever. By freely controlling the attitude of the nanotube cartridge 6 relative to the protruded portion 4, the surface to which the nanotube is fastened can be selected freely.

Figure 9:
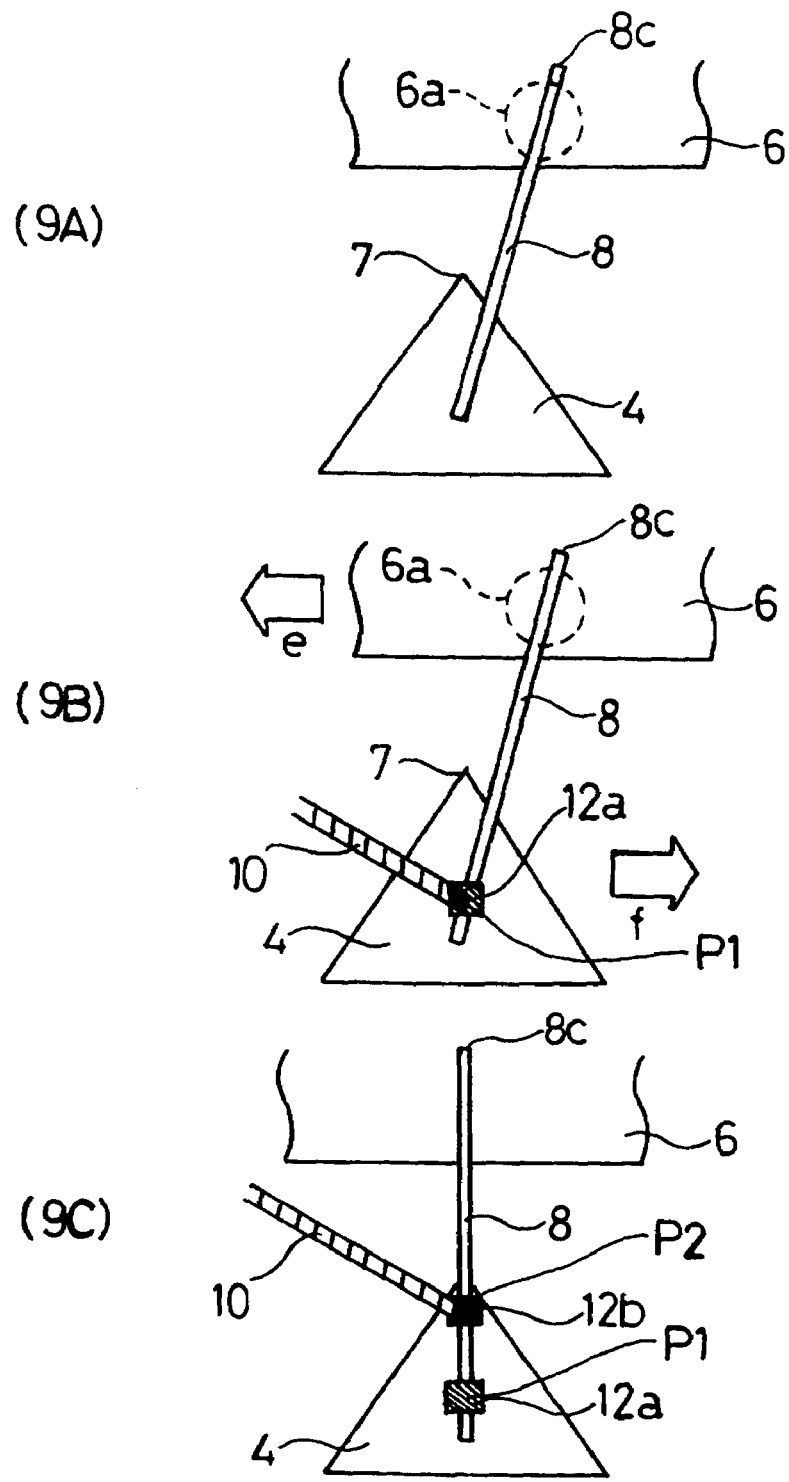
FIG. 9 is a process diagram showing a method of adjusting the nanotube 8 so as to pass through vicinity of the sharp tip end 7 of the protruded portion 4.

FIG. 9 is a process diagram showing the procedures for having the nanotube 8 pass through the vicinity of the tip end 7 of the protruded portion 4. If the nanotube 8 deviates from the tip end 7, it is liable to happen that both the nanotube tip end 8c and the tip end 7 of the protruded portion 4 simultaneously function as probe needle, that can result in such deterioration of the image as image overlapping (double exposure). In order to ensure visible image, it is necessary to prevent the tip end 7 of the protruded portion 4 from function as a probe needle. For this purpose, locating the nanotube 8 to pass through a vicinity of the tip end 7 of protruded portion is effective.

In (9A), the nanotube 8 is adhered to the nanotube cartridge 6 not perpendicularly but obliquely. The nanotube cartridge 6 is a source of supply of nanotube 8, but nanotubes 8 are usually arranged obliquely relative to the edge of the nanotube cartridge 6. The nanotube 8 adhere to the nanotube cartridge 6 in an adhering area 6A, wherein such adhesion takes place due to the intermolecular attraction. As the method for effecting such adhesion is out of the scope of this invention, it is not discussed here.

In (9B), a nanotube 8 arranged obliquely on the nanotube cartridge 6 is first set in contact with the protruded portion 4, and then the first fastening position P1 in the contact area are subjected to the irradiation of electron beam to form the first coating film 12a. Next, the nanotube 8 is forcibly made to pass the tip end 7 of the protruded portion. There are two methods to do this. The first method is to move the nanotube cartridge 6 in the arrow e direction, so as to allow the nanotube 8 to tilt counterclockwise around the first fastening position P1 as a fulcrum. The second method is to move the protruded portion 4 in the arrow f direction and thereby allow the nanotube 8 to tilt counterclockwise around the adhering area 6a as the fulcrum. In either of these methods, the position of nanotube 8 is corrected so as to pass through the tip end of the protruded portion.

In (9C), the second coating film 12b is formed by irradiation of electron beam 10 on the second fastening position P2 adjacent the tip end 7. Thus, the nanotube 8 is fastened to the protruded portion 4 by the first partial coating film 12a and the second partial coating film 12b in such way that it passes through the vicinity of the tip end 7. Here, the vicinity of the tip end 7 implies the position of the tip end 7 and some area adjacent the tip end 7. It goes without saying that it is optimum to have the nanotube 8 pass directly through the tip end 7.

Figure 10:
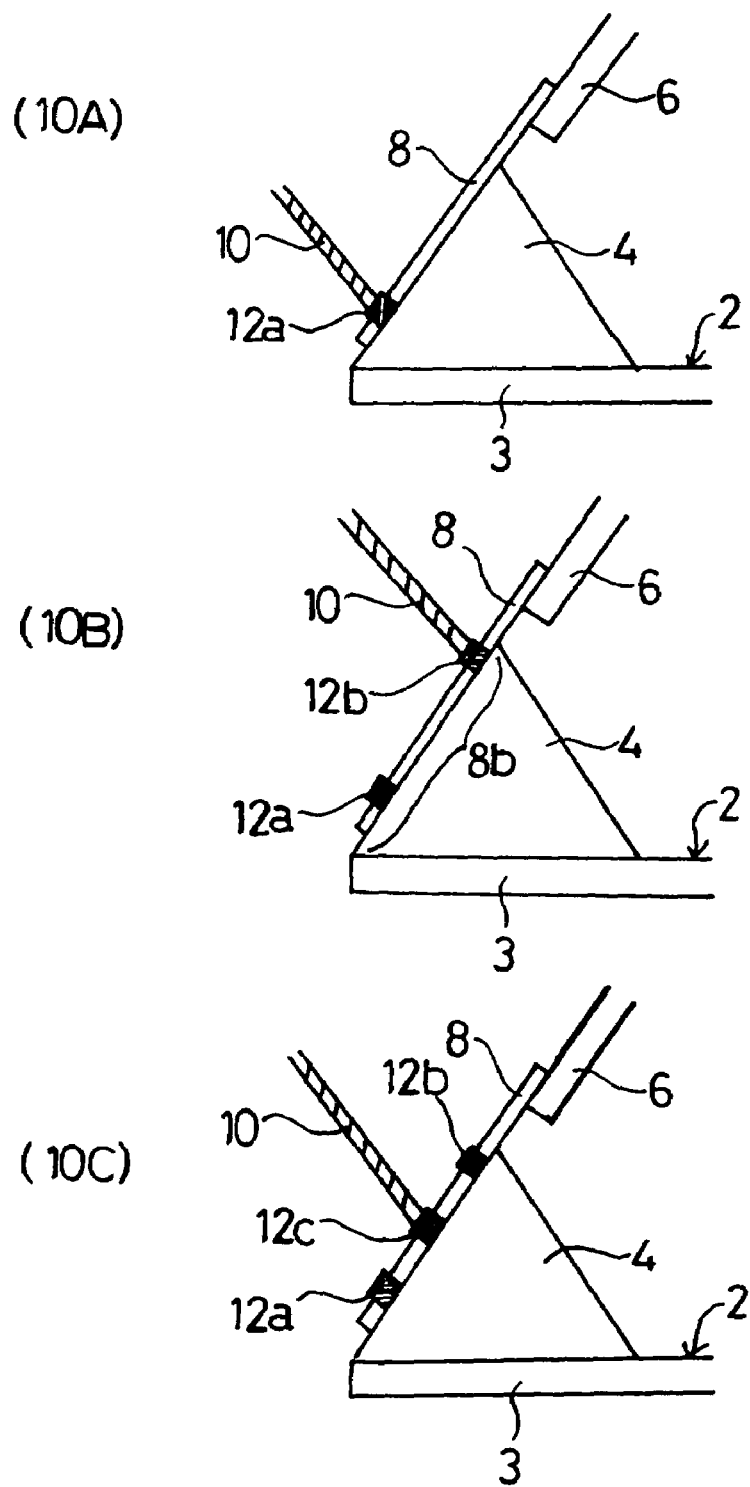
FIG. 10 is a process diagram showing a method to fasten an intermediate area of a nanotube by a third partial coating film 12.

FIG. 10 is a process diagram illustrating a method for forming a third partial coating film 12c on an intermediate position of the nanotube 8. In (10A) and (10B), the same operation as described in FIG. 9 is conducted to fasten the nanotube 8 to the protruded portion 4 by means of the first partial coating film 12a and the second partial coating film 12b. In addition, in order to increase the fastening strength, a third partial coating film 12c is formed by irradiating electron beam 10 in the intermediate area between the first partial coating film 12a and the second coating film 12b. If necessary, further addition of fourth or more partial coating films can be introduced to constitute a multi-point fastening that would ensure further firmness of the fastening.

Figure 11:
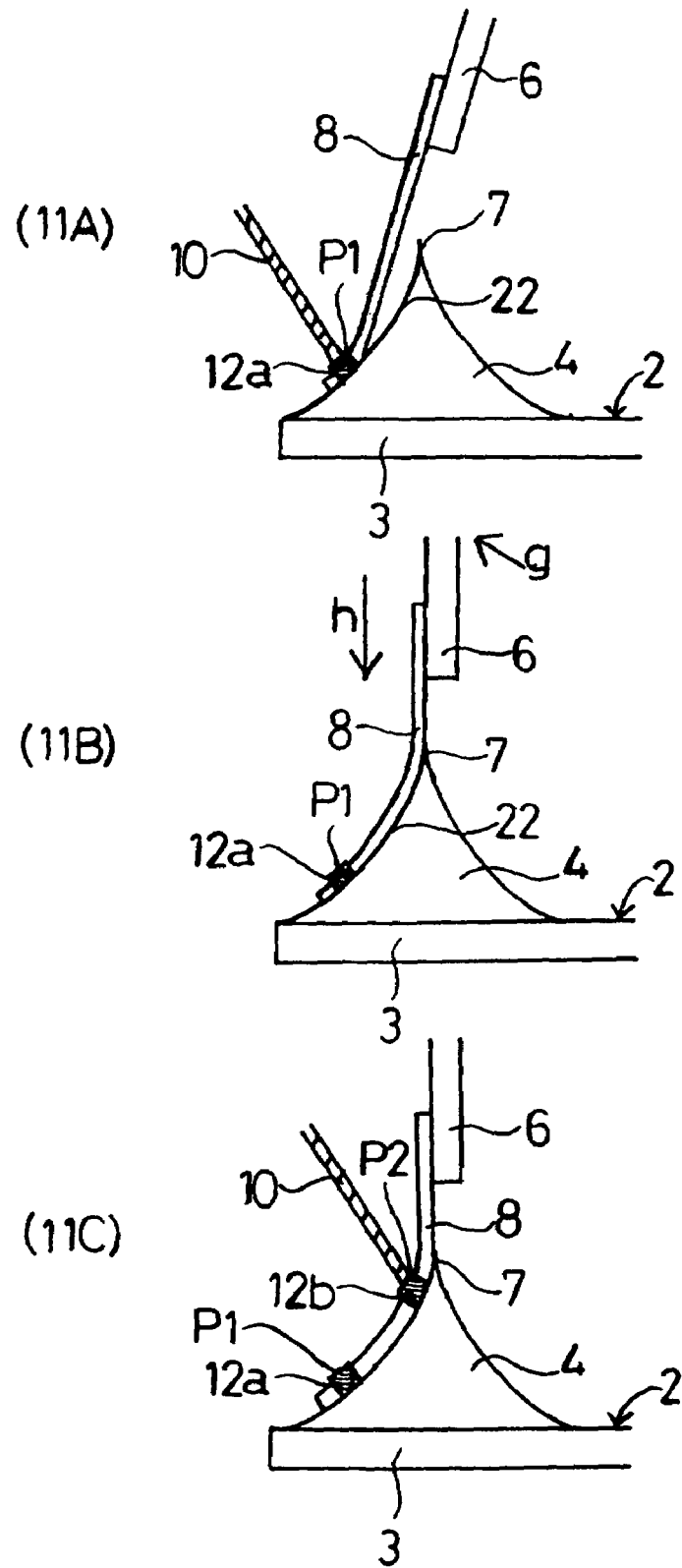
FIG. 11 is a process diagram showing a method of fastening a nanotube 8 on a protruded portion 4 of a cantilever formed in a concavedly curved shape.

FIG. 11 is a process diagram showing a method for fastening a nanotube 8 on the protruded portion 4 of the cantilever of which surface is curved concavedly. The protruded portion has a surface curved concavedly up to the sharp tip end 7, forming a curved surface 22. The process for fastening a nanotube 8 on the curved surface 22 is described in (11A), (11B) and (11C). First in (11A), the first partial coating film 12a is formed by irradiating electron beam 10 on the first fastening position P1 located in the lower area of the nanotube 8. Then in (11B), the nanotube cartridge 6 is moved in the direction of arrow g, and at the same time, moved minutely in the direction of the arrow h to cause the nanotube to have full line contact with the curbed surface while adjusting the nanotube 8 around the first partial coating film 12a as the fulcrum so as to pass through the sharp tip end 7.

In (11C), the electron beam 10 is irradiated on an upper position of the nanotube 8 that has been kept in full line contact with the protruded portion 4 of the cantilever to form the second partial coating film 12b. Since such full line contact between the nanotube 8 and the protruded portion 4 of the cantilever increases the Van der Waals force between them, it further increases the fastening strength. Furthermore, the nanotube fastened in such way has its tip end portion oriented upward almost perpendicular to the cantilever. In consequence, as the nanotube faces virtually perpendicular to the sample surface, the nanotube probe, placed perpendicular to the indentations and projections of the sample surface, can pick up these changes of sample surface accurately, and rapid reduction of erroneous information can be expected.

Figure 12:
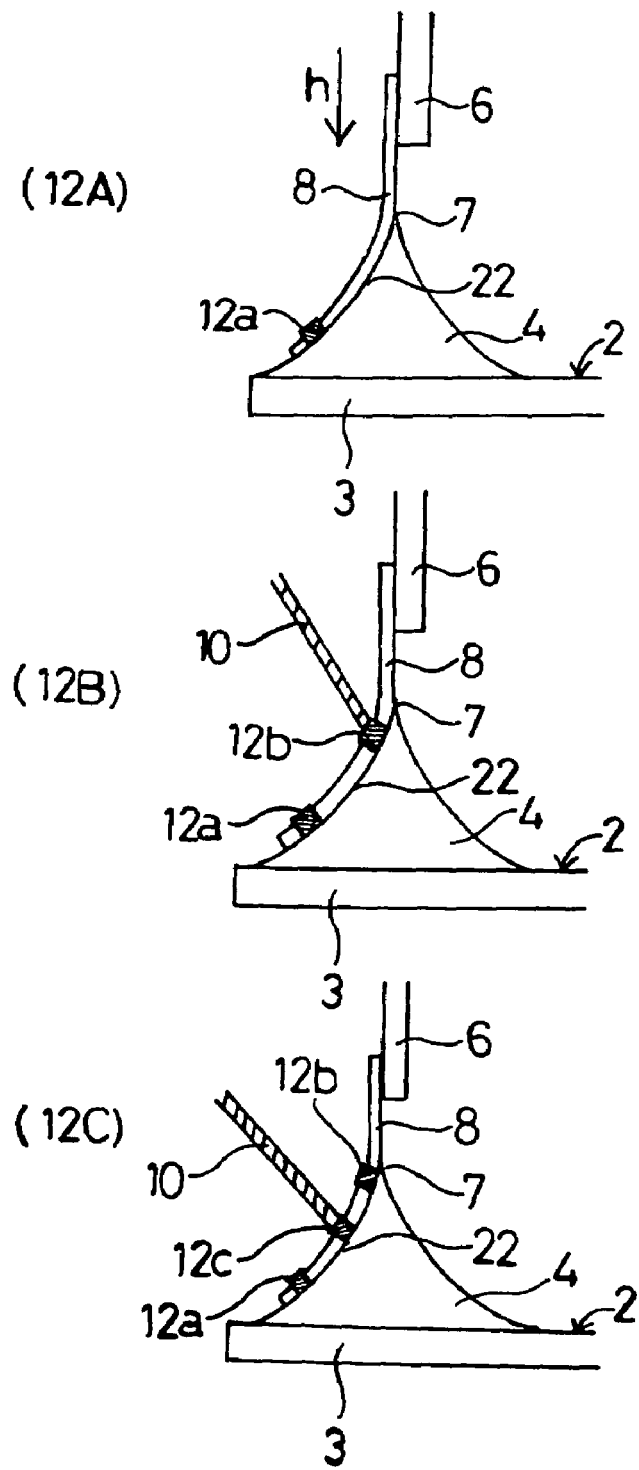
FIG. 12 is a process diagram showing a method of fastening a nanotube 8 on a protruded portion 4 of a cantilever formed in a concavedly curved shape by three partial coating films.

FIG. 12 is a process diagram showing a method for fastening the nanotube 8 on a concavedly curved surface of the protruded portion 4 of cantilever by three fastening points. In (12A) and (12B), the same operation as described in FIG. 11 is conducted to fasten the nanotube 8 on the curved surface 22 by two-point fastening, or the first partial coating film 12a and the second partial coating film 12b, wherein the nanotube 8 is so fixed that it passes through the sharp tip end 7. In (12C), in order to increase the fastening strength, a third partial coating film 12c is formed by irradiation of electron beam in the intermediate area. This third partial coating film 12c is effective to make the bondage between the nanotube 8 and the curved surface 22 firmer. If necessary, a further addition of fourth or more partial coating film can be introduced to constitute a multi-point fastening that would ensure further firmness of the fastening.

Figure 13:
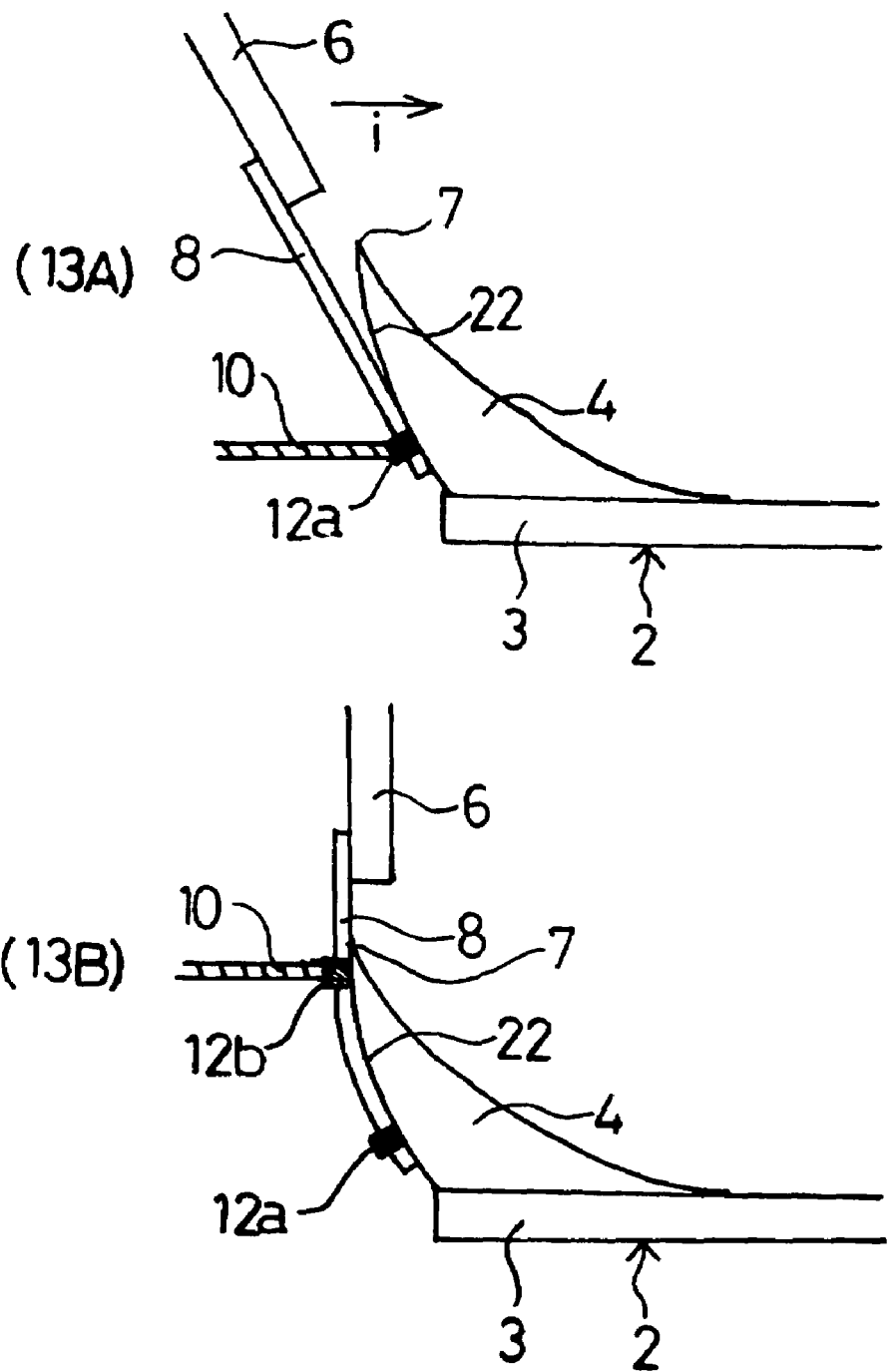
FIG. 13 is a process diagram showing a method of fastening a nanotube 8 on a protruded portion 4 of a cantilever formed in a convexedly curved shape.

FIG. 13 is a process diagram showing a method for fastening the nanotube 8 on a convexedly curved protruded portion 4 of cantilever. In (13A), when the curved surface 22 of a protruded portion 4 of a cantilever is convexedly curved up to the sharp tip end, the first partial coating film 12a is formed by irradiation of electron beam 10 at a lower position of the nanotube 8. Then in (13B), while the nanotube 8 is caused to contact the vicinity of the sharp tip end 7, the second partial coating film 12b is formed in said contact area by irradiation of electron beam. Thus, this partial coating film approach facilitates fastening of a nanotube on the holder surface that has a variety of shapes.

Figure 14:
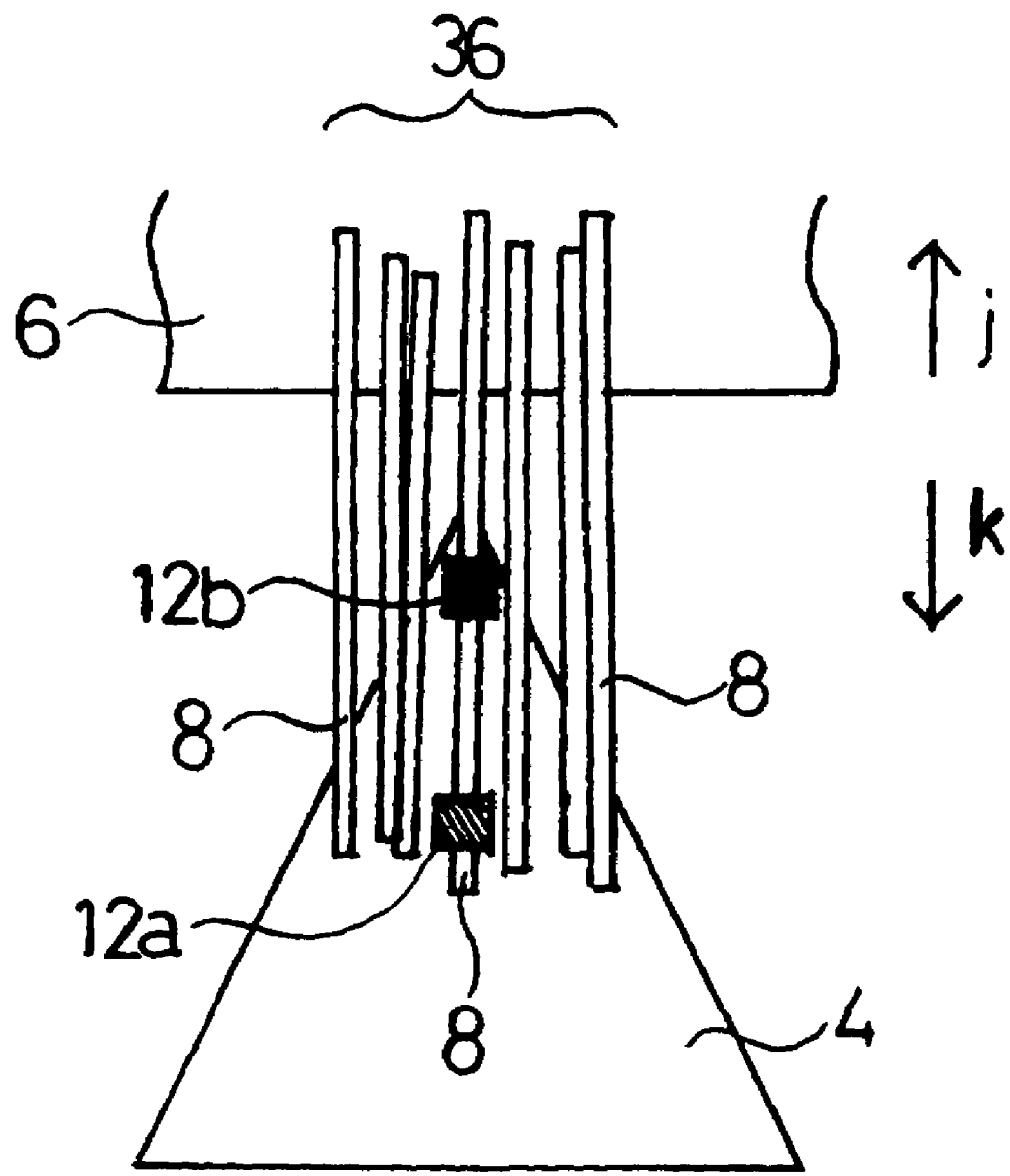
FIG. 14 is a explanatory diagram showing a method of fastening a nanotube 8 out of a plurality of nanotubes 36
Figure 15:
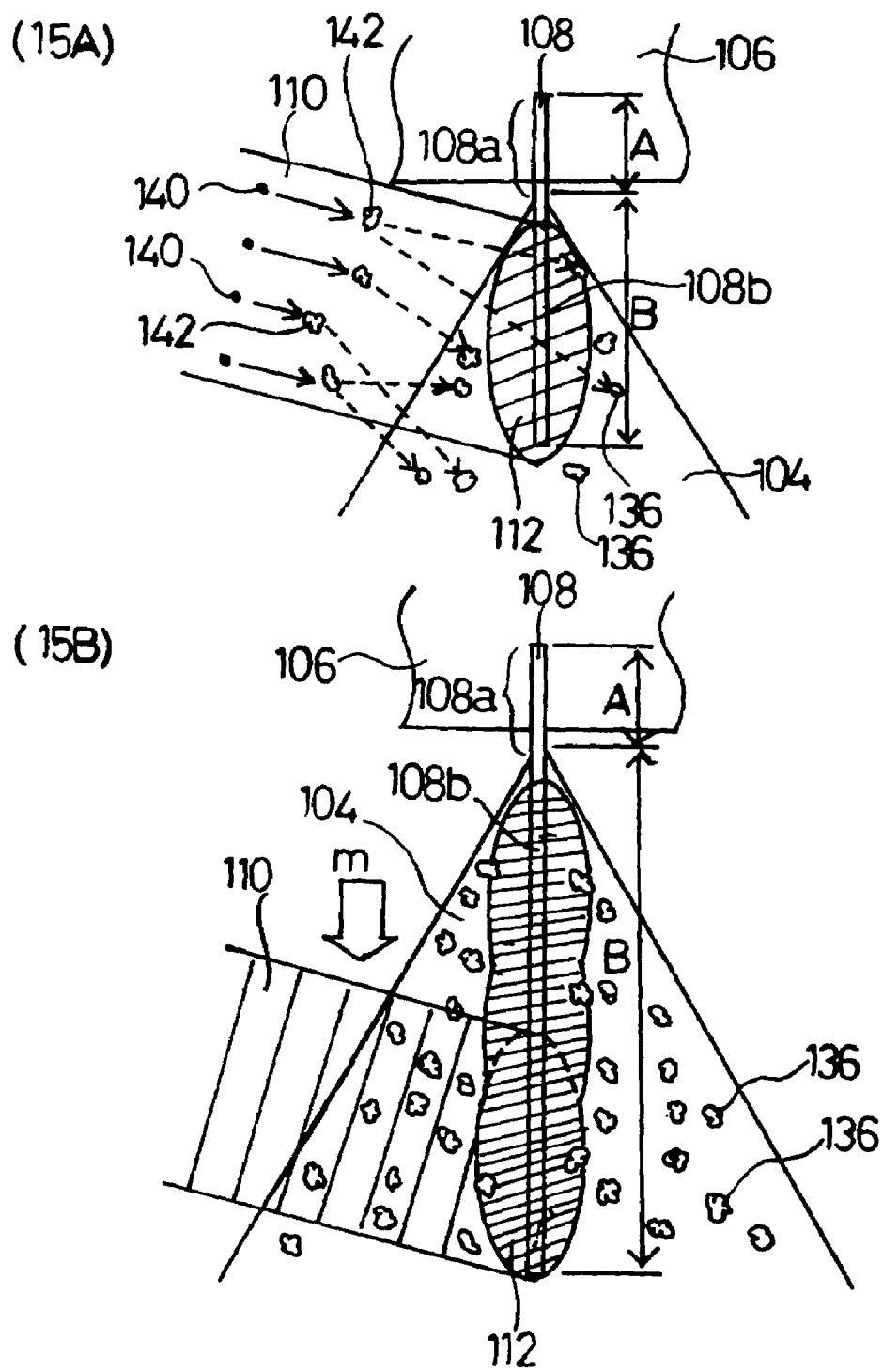
FIG. 15 is a explanatory diagram showing a method of constructing a nanotube probe by conventional technology.
Figure 16:
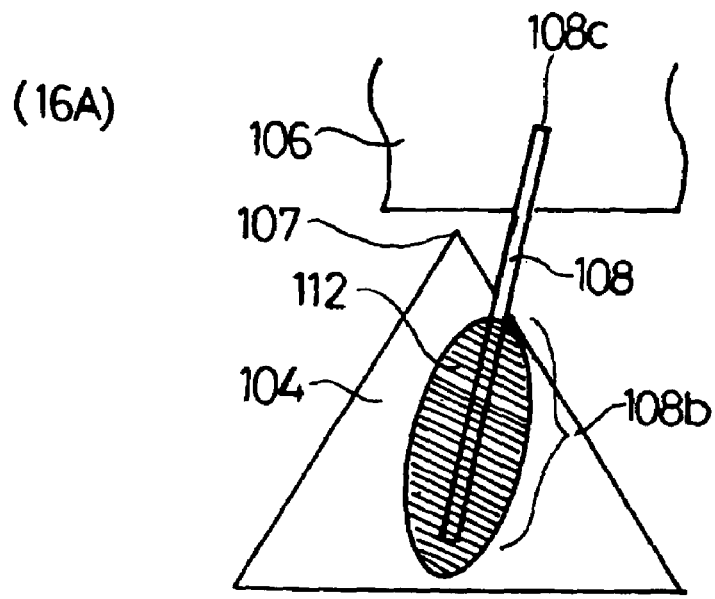
FIG. 16 shows a structural diagram of defective conventional nanotube probe and a perspective view of measurement using said nanotube probe.
Figure 16:
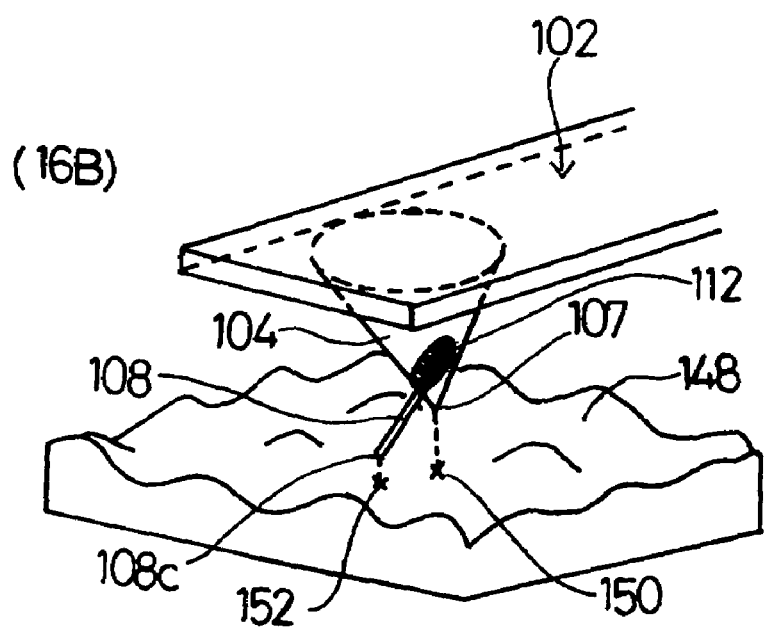
Figure 17:
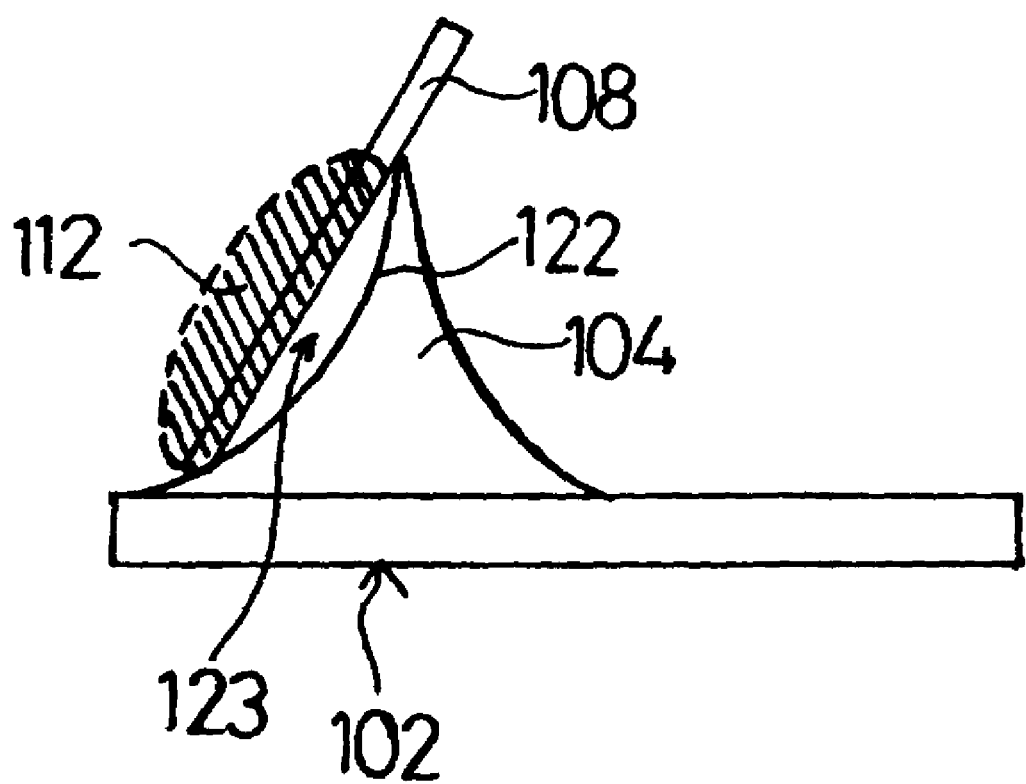
FIG. 17 is a structural diagram showing a conventional protruded portion 104 of cantilever having curved side face and a nanotube 108.

FIG. 14 is an explanatory diagram showing the method for fastening one nanotube 8 out of a group of nanotubes 36. From the group of several to several tens of nanotubes placed on the nanotube cartridge 6, an appropriate nanotube is selected as the probe needle. This nanotube only is then fastened to the protruded portion 4 of cantilever by irradiating electron beam having a minute beam diameter. In other words, as long as the partial coating films 12a and 12b are kept smaller than the clearance between the neighboring nanotubes adhered to the nanotube cartridge 6, a single nanotube can be fastened, and thereafter the nanotube cartridge 6 can be retired in the direction of the arrow j, or instead the protruded portion 4 of the cantilever may be retired in the direction of the arrow k, so that the selected nanotube 8 only can be removed. In this way, by picking up nanotube 8 one by one from a single nanotube cartridge 6, a plenty of nanotube probe can be manufactured. Therefore, this method enables to improve remarkably the production efficiency for nanotube probes.

In the above-described example, an electron microscope is used as the view-magnifying device, and an electron beam for forming the partial coating films. However, other view magnifying devices and charged beam can be used in accordance with the purposes. For instance, a focusing ion beam device can be employed to use ion beam as the charged beam.

INDUSTRIAL APPLICABILITY

According to the first mode of the present invention, wherein a nanotube is fastened to a holder surface with partial coating films, a substantial reduction of fastening time is made possible so that both the mass-production and reduction of production cost can be accomplished. Furthermore, by reducing the size of the partial coating film, the same nanotube cartridge can be used repeatedly, so as to improve production efficiency for nanotube probes.

According to the second through the fourth modes, the size requirement for the partial coating film are defined as $W/d \geq 0.1$, $L/\geq 0.3$ and $T \geq 1$ (nm), where W represents the maximum coating skirt width, d represents the nanotube diameter, L represents the coating length and T represent the average coating thickness. Since the energy flow density, irradiation time and scanning range (beam oscillation width) of the charged beam can be initially set so that these conditions can be satisfied, it is possible to manufacture the nanotube probes without skilled operators. Thus, significant improvement of productivity is possible.

According to the fifth mode, since a nanotube can be manufactured by simply fastening a nanotube with the use of partial coating films on the cantilever used conventionally, it is possible to achieve significant cost reduction.

According to the sixth mode, the partial coating films can be used to fasten a nanotube on a curved surface of protruded portion of the cantilever by applying partial coating films at contact points only. Even in case the contact area between the nanotube and said curved surface is small, the partial coating film on the contact area can achieve as strong fastening as the overall coating film. This does not only enable to cut down on the production time, but also facilitate the use of conventional cantilever to a great extent, ensuring attainment of labor saving.

According to the seventh mode, the possibility of the sharp tip end of the protruded portion functioning as a probe needle is eliminated by having the nanotube pass through the vicinity of the sharp end of the protruded portion, so that a highly accurate surface image can be obtained by only the nanotube probe. Thus, reliability of the nanotube probe can be drastically improved. To be more specific, elimination of double exposure ensures correct detection of nanostructure of substance sample or organic sample, providing an epoch-making measuring device for nanotechnology.

The eighth mode of the present invention enables to shorten the production time of nanotube probe, and makes it feasible to realize mass-production and cost reduction.

According to the ninth mode of the present invention, the possibility of the sharp tip end of the protruded portion functioning as a probe needle is eliminated by having the nanotube pass through the vicinity of the sharp end of the protruded portion, so that a highly accurate surface image can be obtained by only the nanotube probe. Thus, reliability of the nanotube probe can be drastically improved. To be more specific, elimination of double exposure ensures correct detection of nanostructure of substance sample or organic sample, providing an epoch-making measuring device for nanotechnology.

The tenth mode of the present invention allows nanotube probe to be made by fastening a nanotube on a curved surface with the partial coating films. As this enables to construct nanotube probes using holders of arbitrary shapes, diversification of nanotube probe is expected.

According to the eleventh mode, since the nanotube is fastened to the curved surface of the protruded portion of the cantilever in a state of close line-contact, the fastening strength by the partial coating films can be augmented by the Van der Waals force between the contacting surfaces, so that more durable nanotube probe can be provided. Furthermore, since the nanotube probe needle in this mode is made to be perpendicular to the sample surface, it can detect the indentations and projections on the sample surface accurately.

According to the twelfth mode, fastening strength of the nanotube is further increased by three partial coating films on the base end portion of the nanotube.

According to the thirteenth mode, the fastening operation is conducted in direct observation under an electron microscope, so that the partial coating film can be formed at high precision. In addition to the formation of coating films, other tasks, like processing of nanotube and addition of functional substances, can be conducted precisely in the electron microscope.

According to the fourteenth mode, coating film can be formed by the use of electron beam or ion beam. Since it is possible to manufacture nanotube probe utilizing the existing electron microscope and focusing ion beam apparatus (FIB apparatus), no new charged beam generator is required. As the electromagnetic control has been developed for electron beam and ion beam, high precision microscopic processing is made possible.

According to the fifteenth mode, merely by regulating the scanning range of the electron beam or ion beam, the average thickness, coating length, and maximum coating skirt width can be changed freely. Consequently, nanotube probes can be manufactured using arbitrarily designed holders with desired fastening strength. Furthermore, as the beam can be narrowed down to the minimum, deposit of impurities on the holder due to the charged beam can be minimized.

The nanotube probes according to the present invention is applicable to ordinary scanning probe microscope. Scanning probe microscopes include scanning tunnel microscopes (STM) which detect a tunnel current, atomic force microscopes (AFM) which detect surface indentations and projections using the Van der Waals force, leveling force microscopes (LFM) which detect surface differences by means of frictional force, magnetic force microscopes (MFM) which detect magnetic interactions between a magnetic probe needle and magnetic field regions on the sample surface, electric field force microscopes (EFM) which apply a voltage across the sample and probe needle, and detect the electric field force gradient, and chemical force microscopes (CFM) which image the surface distribution of chemical functional groups, etc. What these microscopes have in common is that they all detect characteristic physical or chemical actions by means of a probe needle, and thus attempt to detect surface information with a high resolution at the atomic level. Therefore, the use of nanotube probes according to the present invention will help improve resolving power and measuring accuracy to a drastic extent.

The invention claimed is:

1. In a nanotube probe comprising a holder and a nanotube fastened thereon by a coating film on a base end portion of said nanotube in such fashion that a tip end portion of said nanotube is protruded, a nanotube probe characterized in that said coating film comprises a plurality of partial coating films fastening, respectively, a plurality of positions of said base end portion of said nanotube on a surface of said holder, and said partial coating films are separated without overlapping each other.

2. The nanotube probe according to claim 1, wherein each of said partial coating film is designed to satisfy a relationship of W/d≧0.1, where W represents the maximum width of a skirt of said coating film in contact with said holder in a direction perpendicular to an axis of said nanotube, and d represents a diameter of said nanotube.

3. The nanotube probe according to claim 1, wherein each of said partial coating film is designed to satisfy a relationship of L/d≧0.3, where L represents an axial length of said partial coating film directly holding said nanotube and d represents a diameter of said nanotube.

4. The nanotube probe according to claim 1, wherein an average thickness T of said partial coating film is 1 nm or more.

5. The nanotube probe according to claim 1, wherein a protruded portion of a cantilever is used as said holder, said base end portion of said nanotube is arranged so as to contact with said protruded portion, and said partial coating film is formed on each of two or more contact areas.

6. The nanotube probe according to claim 5, wherein a side face of said protruded portion is curved up to a tip end of said protruded portion, and said partial coating films are formed at positions where said base end portion of said nanotube is in contact with said curved surface.

7. The nanotube probe according to claim 5 or 6, wherein said nanotube is arranged so as to pass through a vicinity of said sharp tip end of said protruded portion.

8. In a method for manufacturing a nanotube probe comprising a holder and a nanotube fastened thereon by way of a coating film on a base end portion of said nanotube in such fashion that a tip end portion is protruded, a method for manufacturing a nanotube probe characterized in that said coating film comprises at least two partial coating films, a first coating film is formed by coating partially a first fastening position of said base end portion of said nanotube while keeping said first fastening position in contact with said surface of said holder, a second partial coating film is formed by coating partially a second fastening position of said base end portion of said nanotube while keeping said second fastening position in contact with said surface of said holder, and said first and second partial coating films are separated without overlapping each other.

9. The method for manufacturing said nanotube probe according to claim 8, wherein a protruded portion of a cantilever is used as said holder, said first partial coating film is formed at a lower position of said base end portion of said nanotube, and said second partial coating film is formed at an upper position of said base end portion of said nanotube while keeping said nanotube in such fashion that said nanotube passes through a vicinity of a sharp tip end of said protruded portion.

10. The method for manufacturing said nanotube probe according to claim 9, wherein, in a case that a side face of said protruded portion of said cantilever is curved up to its sharp tip end, said first partial coating film is formed at said lower position of said base end portion of said nanotube, an intermediate area of said nanotube is kept in non-contact with said protruded portion, and second partial coating film is formed at a contact area where said upper position of said base end portion of said nanotube is in contact with said vicinity of said sharp tip end of said protruded portion.

11. The method for manufacturing said nanotube probe according to claim 9, wherein, in a case that a side face of said protruded portion of said cantilever is curved up to its sharp tip end, said first partial coating film is formed at said lower position of said base end portion of said nanotube, an intermediate area of said nanotube is forcibly bent along said curved surface, said nanotube is adjusted around said first partial coating film as a fulcrum so as to cause said nanotube to pass through said sharp tip end of said protruded portion, no matter which of said forcible bending or said passing adjustment is performed first, and said second partial coating film is formed at a contact area where said upper position of said base end portion of said nanotube is in contact with a vicinity of said sharp tip end of said protruded portion.

12. The method for manufacturing said nanotube probe according to claim 11, wherein said intermediate area is fastened by a third partial coating film after forming said second partial coating film.

13. The method for manufacturing said nanotube probe according to any of claims 8 through 12, wherein each of said partial coating film is formed in an electron microscope or a focusing ion beam apparatus while observing the work directly.

14. The method for manufacturing said nanotube according to claim 13, wherein each of said partial coating films is formed by deposit of decomposed components generated by means of an electron beam or an ion beam.

15. The method for manufacturing said nanotube probe according to claim 14, wherein a size of said partial coating film is controlled by way of restricting a scanning range of said electron beam of said ion beam.

\* \* \* \* \*